United States Patent [19]
Takahara et al.

[11] Patent Number: 6,142,633
[45] Date of Patent: Nov. 7, 2000

[54] POLARIZED LIGHT ILLUMINATOR AND PROJECTION TYPE IMAGE DISPLAY APPARATUS

[75] Inventors: Ikuo Takahara, Nara; Hiroshi Nakanishi, Sakurai; Hiromi Kato, Nara, all of Japan

[73] Assignee: Sharp Kabushiki Kaisha, Osaka, Japan

[21] Appl. No.: 09/124,094

[22] Filed: Jul. 29, 1998

[30] Foreign Application Priority Data

Jul. 31, 1997 [JP] Japan .................................. 9-205993

[51] Int. Cl.$^7$ .................................................. G03B 21/14
[52] U.S. Cl. .................................................. 353/20; 349/9
[58] Field of Search .................................. 353/20, 31, 34, 353/37; 349/8, 9; 359/487, 490, 494, 495, 497

[56] References Cited

U.S. PATENT DOCUMENTS

| | | | |
|---|---|---|---|
| 5,601,351 | 2/1997 | Van Den Brandt | 353/20 |
| 5,626,408 | 5/1997 | Heynderickx et al. | 353/20 |
| 5,657,164 | 8/1997 | Shuman | 359/494 |
| 5,691,830 | 11/1997 | Dickson et al. | 359/487 |
| 5,715,029 | 2/1998 | Fergason | 359/495 |
| 5,729,306 | 3/1998 | Miyake et al. | 349/9 |
| 5,748,369 | 5/1998 | Yokota | 353/20 |
| 5,751,480 | 5/1998 | Kitagishi | 359/485 |
| 5,764,412 | 6/1998 | Suzuki et al. | 353/20 |
| 5,826,960 | 10/1998 | Gotoh et al. | 353/20 |
| 5,863,125 | 1/1999 | Doany | 353/20 |
| 5,865,521 | 2/1999 | Hashizume et al. | 353/20 |

FOREIGN PATENT DOCUMENTS

| | | |
|---|---|---|
| 0 753 780 | 1/1997 | European Pat. Off. . |
| 002116448 | 6/1997 | Germany . |
| 8-234205 | 9/1996 | Japan . |
| 9 146064 | 6/1997 | Japan . |
| 9-146063 | 6/1997 | Japan . |
| 9-171157 | 6/1997 | Japan . |
| 10-133147 | 5/1998 | Japan . |

OTHER PUBLICATIONS

Minami et al, Special Issue 2: A Dramatically Improved Liquid Crystal Projector, 'Pana–Sirius' Series, TH–L592J (TH–L392J), Apr. 1997, pp. 100–104.

*Primary Examiner*—William Dowling
*Attorney, Agent, or Firm*—Nixon & Vanderhye P.C.

[57] ABSTRACT

The polarized light illuminator of this invention includes: a light source; a first fly's eye lens and a second fly's eye lens disposed in this order from the light source; a polarization separation element disposed between the light source and the second fly's eye lens for separating unpolarized light into a first polarized light component and a second polarized light component having polarization directions perpendicular to each other, to output the first polarized light component and the second polarized light component in different directions from each other; and a polarization conversion element disposed near the second fly's eye lens for converting the first polarized light component and the second polarized light component output from the polarization separation element into unidirectionally polarized light, wherein the polarization separation element has a first flat plate and a second flat plate, the first flat plate having a polarization separation surface for reflecting the first polarized light component and transmitting the second polarized light component, while the second flat plate having a reflection surface for reflecting the second polarized light component which has passed through the first flat plate, the polarization separation surface and the reflection surface being disposed at different angles from each other with respect to the optical axis of the light source.

12 Claims, 22 Drawing Sheets

POLARIZED LIGHT ILLUMINATOR AND PROJECTION TYPE IMAGE DISPLAY APPARATUS

BACKGROUND OF THE INVENTION

1. Field of the Invention

The present invention relates to a polarized light illuminator which unifies randomly polarized light (unpolarized light or natural light) emitted from a light source into unidirectionally polarized light having a uniform polarization direction, to illuminate an image display device such as a liquid crystal panel with the unidirectionally polarized light, and a projection type image display apparatus using such a polarized light illuminator.

2. Description of the Related Art

A polarized light illuminator as shown in FIG. 18 is disclosed in Japanese Laid-Open Publication No. 8-234205.

Referring to FIG. 18, a polarized light illuminator includes a light source 100, a rectangular prism 115, a wedge type prism 120, a first fly's eye lens 130, a second fly's eye lens 140, a light refracting prism 125, and a polarization conversion element 150 having $\lambda/2$ wave plates. A polarization separation film 180 composed of a dielectric multilayer film is formed on one surface of the wedge type prism 120 in contact with the rectangular prism 115 (i.e., between the rectangular prism 115 and the wedge type prism 120). A reflection film 190 made of evaporated Al is formed on the opposite surface of the wedge type prism 120. The polarization conversion element 150 is composed of $\lambda/2$ wave plates 200 and transparent regions 145. Light which has passed through the left half of each lens portion of the second fly's eye lens 140 passes through the corresponding transparent region 145, while light which has passed through the right half thereof passes through the corresponding $\lambda/2$ wave plate 200.

Functions of the above components will be described.

Randomly polarized light emitted from the light source 100 is incident on the rectangular prism 115. Only an S-polarized light component (a light component having a polarization direction perpendicular to the incident surface) of the incident light is reflected by the polarization separation film 180 formed between the rectangular prism 115 and the wedge type prism 120. A P-polarized light component (a light component having a polarization direction parallel to the incident surface) which has passed through the polarization separation film 180 is reflected by the reflection film 190 formed on the surface of the wedge type prism 120 opposite to the polarization separation film 180. The surface from which the S-polarized light is reflected (the surface of the wedge type prism 120 in contact with the rectangular prism 115) and the surface from which the P-polarized light is reflected (the opposite surface of the wedge type prism 120) have different angles with respect to the optical axis of the light source 100. Thus, the S-polarized light and the P-polarized light are incident on the first fly's eye lens 130 at different angles.

As a result, different converged points of the S-polarized light and the P-polarized light are formed side by side on the second fly's eye lens 140. The polarization conversion element 150 composed of the transparent regions 145 and the $\lambda/2$ wave plates 200 is disposed close to the second fly's eye lens 140 (on either the incident side or the output side thereof). The transparent regions 145 correspond to the portions of the second fly's eye lens 140 where the S-polarized light is output, while the $\lambda/2$ wave plates 200 corresponds to the portions thereof where the P-polarized light is output. Thus, the P-polarized light is converted into S-polarized light by the $\lambda/2$ wave plates 200. As a result, only S-polarized light is output from the polarization conversion element 150 and directed to a liquid crystal panel 170 via a plano-convex lens 160, to illuminate the liquid crystal panel 170 with the S-polarized light.

In this conventional polarized light illuminator, the randomly polarized light emitted from the light source 100 is unified into S-polarized light so that the liquid crystal panel 170 is illuminated with the unidirectionally polarized light. With such a construction, light emitted from the light source can be effectively utilized in a type of liquid crystal panel where images are displayed by modulating the polarization of light. However, the above construction requires a large glass prism, which increases the weight and cost of the device.

The above-cited Japanese Laid-Open Publication No. 8-234205 discloses another polarized light illuminator as shown in FIG. 19 to overcome the above problem.

Referring to FIG. 19, a polarized light illuminator includes a light source 100, a flat plate 110, a wedge type prism 120, a first fly's eye lens 130, a second fly's eye lens 140, and a polarization conversion element 150 having $\lambda/2$ wave plates. A polarization separation film 180 composed of a dielectric multilayer film is formed on one surface of the wedge type prism 120 in contact with the flat plate 110 (i.e., between the flat plate 110 and the wedge type prism 120). A reflection film 190 made of evaporated Al is formed on the opposite surface of the wedge type prism 120. The polarization conversion element 150 is composed of $\lambda/2$ wave plates 200 and transparent regions 145. Light which has passed through the left half of each lens portion of the second fly's eye lens 140 passes through the corresponding transparent region 145, while light which has passed through the right half thereof passes through the corresponding $\lambda/2$ wave plate 200.

Functions of the above components will be described.

Randomly polarized light emitted from the light source 100 is incident on the flat plate 110. Only an S-polarized light component of the incident light is reflected by the polarization separation film 180 formed between the flat plate 110 and the wedge type prism 120. A P-polarized light component which has passed through the polarization separation film 180 is reflected by the reflection film 190 formed on the opposite surface of the wedge type prism 120. The surface from which the S-polarized light is reflected (the surface of the wedge type prism 120 in contact with the flat plate 110) and the surface from which the P-polarized light is reflected (the opposite surface of the wedge type prism 120) have different angles with respect to the optical axis of the light source 100. Thus, the S-polarized light and the P-polarized light are incident on the first fly's eye lens 130 at different angles.

As a result, different converged points of the S-polarized light and the P-polarized light are formed side by side on the second fly's eye lens 140. The polarization conversion element 150 composed of the transparent regions 145 and the $\lambda/2$ wave plates 200 is disposed close to the second fly's eye lens 140 on the output side thereof. The transparent regions 145 correspond to the portions of the second fly's eye lens 140 where the S-polarized light is output, while the $\lambda/2$ wave plates 200 corresponds to the portions thereof where the P-polarized light is output. Thus, the P-polarized light is converted into S-polarized light by the $\lambda/2$ wave plates 200. As a result, only S-polarized light is output from the polarization conversion element 150 and directed to a liquid crystal panel 170 via a plano-convex lens 160, to illuminate the liquid crystal panel 170 with the S-polarized light.

Since no large prism is included, this conventional construction is advantageous over the construction shown in FIG. 18 in the aspects of weight and cost.

Another type of the polarized light illuminator as shown in FIG. 20 is described in "Monthly Display", Techno-Times Co., April 1997, pp. 100–104.

Referring to FIG. 20, a polarized light illuminator includes a light source 250, a first fly's eye lens 260, a rectangular prism 270, a flat prism 280, a second fly's eye lens 290, and a polarization conversion element 310 having $\lambda/2$ wave plates. A polarization separation film 340 composed of a dielectric multilayer film is formed on one surface of the flat prism 280 in contact with the rectangular prism 270 (i.e., between the rectangular prism 270 and the flat prism 280). A reflection film 350 is formed on the opposite surface of the flat prism 280. The polarization conversion element 310 is composed of $\lambda/2$ wave plates 300 and transparent regions 305.

Two adjacent lens portions of the second fly's eye lens 290 correspond to one lens portion of the first fly's eye lens 260. Light which has passed through one of any pair of adjacent lens portions of the second fly's eye lens 290 is incident on the transparent region 305 of the polarization conversion element 310, while light which has passed through the other of the pair of lens portions is incident on the $\lambda/2$ wave plates 300.

Functions of the above components will be described.

Light emitted from the light source 250 passes through the first fly's eye lens 260. Only an S-polarized light component of the incident light is reflected by the polarization separation film 340 formed between the rectangular prism 270 and the flat prism 280. A P-polarized light component which has passed through the polarization separation film 340 is reflected by the reflection film 350 formed on the opposite surface of the flat prism 280, and passes again through the polarization separation film 340. Thus, the optical axes of the S-polarized light and the P-polarized light are displaced with each other by an amount corresponding to the thickness of the flat prism 280, so that the S-polarized light and the P-polarized light are incident on adjacent lens portions of the second fly's eye lens 290. The polarization conversion element 310 composed of the transparent regions 305 and the $\lambda/2$ wave plates 300 is disposed close to the second fly's eye lens 290 (on either the incident side or the output side thereof). Each of the $\lambda/2$ wave plates 300 is aligned with the lens portion of the second fly's eye lens 290 through which the P-polarized light passes, while each of the transparent regions 305 is aligned with the lens portion through which the S-polarized light passes. Only the P-polarized light is therefore converted into S-polarized light by the $\lambda/2$ wave plate 300. As a result, the liquid crystal panel 330 is illuminated with only S-polarized light via the plano-convex lens 320.

In the conventional polarized light illuminators described above, light emitted from a light source can be converted into unidirectionally polarized light. Using this technique, light from a light source can be effectively utilized when an image display device is used, such as a liquid crystal panel of a birefringence mode or a twisted mode, where images are displayed by modulating the polarization of light.

The above-described conventional polarized light illuminators have the following problems.

The conventional polarized light illuminator shown in FIG. 19 is disadvantageous in the following points. FIG. 21 is a schematic view for explaining the optical paths of the P-polarized light and the S-polarized light for the polarized light illuminator of FIG. 19. This specific polarized light illuminator shown in FIG. 21 is constructed so that the P-polarized light and the S-polarized light are incident on the first fly's eye lens 130 at angles displaced by ±3° with respect to the normal of the surface of the first fly's eye lens 130. Assuming that the refractive indexes of the flat plate 110 and the wedge type prism 120 are 1.52 (BK7), the polarization separation film 180 formed on the flat plate 110 and the surface of the wedge type prism 120 on which the reflection film 190 is formed are tilted by 46.5° and 45°, respectively, with respect to the optical axis of the light source 100.

With the above construction, the optical paths of the P-polarized light and the S-polarized light should desirably intersect with each other on the incident surface of the first fly's eye lens 130. In reality, however, as shown in FIG. 19, the optical paths of the P-polarized light and the S-polarized light output from the wedge type prism 120 are displaced more the further they are from the prism. As a result, when the first fly's eye lens 130 has a width identical to the output beam diameter of the light source 100, part of the light fails to be incident on the first fly's eye lens 130 (a hatched portion 20 in FIG. 19), resulting in light loss. On the other hand, when the width of the first fly's eye lens 130 is made larger so that the portion of light corresponding to the hatched portion 20 can be incident on the first fly's eye lens 130, the following problem arises. That is, the portion of light output from the end portion of the widened first fly's eye lens 130 is directed to enter the liquid crystal panel 170 at a large incident angle. Such light will not be received by a projection lens.

Such a failure to realize the intersection between the optical paths of the light reflected by the polarization separation film and the light reflected by the reflection film on the first fly's eye lens 130 is a problem specific to the device using the combination of the flat plate 110 and the wedge type prism 120. This also applies to the construction as shown in FIG. 22 where the top of the wedge is located in reverse.

The top portion of the wedge type prism 120 is beveled to protect against cracking, breaking, and the like at the end faces. Such beveling increases the distance between the polarization separation surface and the reflection surface. As a result, the intersection between the optical paths of the light reflected by the polarization separation surface and the light reflected by the reflection surface fails to be located right on the first fly's eye lens, which generates light loss.

The wedge type prism 120 is generally produced by grinding a flat prism. The cost is therefore high compared with the case where a flat prism is used. Thus, using the wedge type prism causes a number of problems as described above.

The conventional polarized light illuminator shown in FIG. 20 is disadvantageous in the following points. A polarized light illuminator should desirably provide light from a light source to a liquid crystal panel without light loss. In reality, however, light is lost due to a variety of factors. One of such factors is the reflection of light from a glass surface. About 4% of light is reflected from a glass surface unless the glass surface is subjected to anti-reflection (AR) coating. It is therefore desirable to minimize the use of glass surfaces in an optical path. Although the reflection of light from the glass surface can be reduced by surface treatment such as AR coating, this increases the cost.

In the construction shown in FIG. 20, light is lost at an incident surface 360 and an output surface 370 of the rectangular prism 270. If such surfaces are subjected to AR coating to avoid the light loss, the cost increases. Therefore, the number of optical faces should be as small as possible.

The rectangular prism 270 is required to have a size corresponding to the diameter of a reflector 251 for the light source 250. A normal polarized light illuminator uses a reflector with a diameter of about 80 to 100 mm for a light source. In order to meet this size, a large rectangular prism is required. This increases the weight and the cost of the device.

In the three conventional polarized light illuminators described above, the polarization separation film composed of a normal dielectric multilayer film is used. In general, a greater effect is obtained when S-polarized light is reflected from the polarization separation film. These conventional polarized light illuminators are therefore constructed to have this effect. However, in the case where the alignment direction of liquid crystal in the image display device is tilted with respect to the polarization direction of the S-polarized light or the P-polarized light, both the light reflected by the polarization separation film and the light reflected by the reflection film are required to pass through the wave plate so as to convert the polarization directions thereof. The wave plate, however, does not convert the polarization direction of all the light over the visible wavelength range because it has a wavelength dependence. A light component which has not been converted into light with a desirable polarization direction is not usable for the image display device, resulting in light loss. Light is also lost due to the absorption by the wave plate when the light passes through the wave plate.

SUMMARY OF THE INVENTION

The polarized light illuminator of this invention includes: a light source; a first fly's eye lens and a second fly's eye lens disposed in this order from the light source; a polarization separation element disposed between the light source and the second fly's eye lens for separating unpolarized light into a first polarized light component and a second polarized light component having polarization directions perpendicular to each other, to output the first polarized light component and the second polarized light component in different directions from each other; and a polarization conversion element disposed near the second fly's eye lens for converting the first polarized light component and the second polarized light component output from the polarization separation element into unidirectionally polarized light, wherein the polarization separation element has a first flat plate and a second flat plate, the first flat plate having a polarization separation surface for reflecting the first polarized light component and transmitting the second polarized light component, while the second flat plate having a reflection surface for reflecting the second polarized light component which has passed through the first flat plate, the polarization separation surface and the reflection surface being disposed at different angles with respect to the optical axis of the light source.

In one embodiment of the invention, the polarization separation element is disposed between the light source and the first fly's eye lens.

In another embodiment of the invention, the polarization separation surface of the first flat plate has an optic axis in the plane of the polarization separation surface, and the direction of the optic axis is substantially equal to a direction of a polarization axis of the first polarized light component.

In still another embodiment of the invention, the polarization separation surface of the first flat plate and the reflection surface of the second flat plate are disposed to face each other.

In still another embodiment of the invention, the first flat plate and the second flat plate are disposed substantially at an angle θ represented by an expression below with each other:

$$\theta = \tan^{-1}(p/4d)$$

where d denotes a distance between the first fly's eye lens and the second fly's eye lens, and p denotes a lens pitch of the second fly's eye lens in a direction where converged spots of the light reflected by the polarization separation surface and the light reflected by the reflection surface are formed side by side.

In still another embodiment of the invention, the first flat plate and the second flat plate are disposed substantially at an angle of 45°−θ/2 and 45°+θ/2, respectively, with respect to the optical axis of the light source.

Alternatively, the polarized light illuminator of this invention includes: a light source; a first fly's eye lens and a second fly's eye lens disposed in this order from the light source; a polarization separation element disposed between the light source and the second fly's eye lens for separating unpolarized light into a first polarized light component and a second polarized light component having polarization directions perpendicular to each other, to output the first polarized light component and the second polarized light component in different directions from each other; and a polarization conversion element disposed near the second fly's eye lens for converting the first polarized light component and the second polarized light component output from the polarization separation element into unidirectionally polarized light, wherein the polarization separation element is formed of crystal having birefringence.

In one embodiment of the invention, the polarization separation element is composed of a Wollaston prism, and the polarization separation element is disposed between the first fly's eye lens and the second fly's eye lens.

In another embodiment of the invention, the polarization separation element is composed of a Wollaston prism, and the polarization separation element is disposed between the light source and the first fly's eye lens.

In still another embodiment of the invention, the polarization separation element is composed of a flat plate formed of crystal having birefringence, and the polarization separation element is disposed between the first fly's eye lens and the second fly's eye lens.

Alternatively, the polarized light illuminator of this invention includes: a light source; a first fly's eye lens and a second fly's eye lens disposed in this order from the light source; a polarization separation element disposed between the light source and the second fly's eye lens for separating unpolarized light into a first polarized light component and a second polarized light component having polarization directions perpendicular to each other; and a polarization conversion element disposed near the second fly's eye lens for converting the first polarized light component and the second polarized light component output from the polarization separation element into unidirectionally polarized light, wherein the polarization separation element has a first flat plate, and the first flat plate has a polarization separation surface and a reflection surface on substantially parallel opposite surfaces of the flat plate, the polarization separation surface reflecting the first polarized light component and transmitting the second polarized light component, while the reflection surface reflecting the second polarized light component which has passed through the polarization separation surface.

In one embodiment of the invention, the polarization separation surface of the first flat plate has an optic axis in the plane of the polarization separation surface, and the direction of the optic axis is substantially equal to a direction of a polarization axis of the first polarized light component.

Alternatively, the polarized light illuminator of this invention includes: a light source; a first fly's eye lens and a second fly's eye lens disposed in this order from the light source; a polarization separation element disposed between the light source and the second fly's eye lens for separating unpolarized light into a first polarized light component and a second polarized light component having polarization directions perpendicular to each other; and a polarization conversion element disposed near the second fly's eye lens for converting the first polarized light component and the second polarized light component output from the polarization separation element into unidirectionally polarized light, wherein the polarization separation element has a first flat plate and a second flat plate, the first flat plate having a polarization separation surface for reflecting the first polarized light component and transmitting the second polarized light component, while the second flat plate having a reflection surface for reflecting the second polarized light component which has passed through the polarization separation surface, the polarization separation surface and the reflection surface of the polarization separation element are disposed substantially in parallel with each other, and the polarization separation element is disposed between the first fly's eye lens and the second fly's eye lens.

Alternatively, the polarized light illuminator of this invention includes: a light source; a first fly's eye lens and a second fly's eye lens disposed in this order from the light source; a polarization separation element disposed between the light source and the second fly's eye lens for separating unpolarized light into a first polarized light component and a second polarized light component having polarization directions perpendicular to each other; and a polarization conversion element disposed near the second fly's eye lens for converting the first polarized light component and the second polarized light component output from the polarization separation element into unidirectionally polarized light, wherein the polarization separation element has a film and a flat plate, the film has a polarization separation surface for reflecting the first polarized light component and transmitting the second polarized light component, while the flat plate has a reflection surface for reflecting the second polarized light component which has passed through the polarization separation surface, the polarization separation surface and the reflection surface of the polarization separation element are disposed substantially in parallel with each other, and the polarization separation element is disposed between the first fly's eye lens and the second fly's eye lens.

In one embodiment of the invention, the polarization separation surface of the film has an optic axis in the plane of the polarization separation surface, and the direction of the optic axis is substantially equal to a direction of a polarization axis of the first polarized light component.

According to another aspect of the invention, a projection type image display apparatus is provided. The apparatus includes: the polarized light illuminator described above; an image display device for being illuminated with polarized light of which the polarization direction is unified by the polarized light illuminator; and a projection lens for magnifying and projecting an image obtained by the image display device Thus, in the polarized light illuminator according to the present invention, the first and second flat plates having the polarization separation surface and the reflection surface, respectively, are used as the polarization separation element. Accordingly, the cost and the weight of the device can be reduced, compared with the case where a large prism and a wedge type prism are used. Since the distance between the polarization separation surface and the reflection surface can be reduced, light loss can be reduced, compared with the case using a wedge type prism. Moreover, since the polarization separation surface and the reflection surface of the polarization separation element are located at different angles from each other with respect to the optical axis of the light source, it is possible to set the optical paths of the first and second polarized light components to intersect with each other on the first fly's eye lens. With this construction, light emitted from the light source can be converted into unidirectionally polarized light with high efficiency, to illuminate the image display device with the light. Thus, the light from the light source can be effectively utilized.

In another embodiment of the polarized light illuminator according to the present invention, the polarization separation surface of the polarization separation element has an optic axis in the plane of the polarization separation surface, to reflect a linearly-polarized light component having a polarization direction along a direction of the optic axis and transmit a polarized light component having a polarization direction perpendicular to the direction of the optic axis. It is therefore possible to construct the polarization separation element so that the polarization separation surface reflects an S-polarized light component, a P-polarized light component, or any other type of polarized light component including a polarized light component having an arbitrary tilt with respect to the optical axis of the P-polarized light component.

In another embodiment of the polarized light illuminator according to the present invention, the polarization separation surface of the first flat plate and the reflection surface of the second flat plate are located to face each other. This further reduces the distance between these faces. Thus, the light loss generated when the light reflected by the polarization separation element is incident on the fly's eye lens is reduced.

In still another embodiment of the polarized light illuminator according to the present invention, the flat plate having the polarization separation surface and the flat plate having the reflection surface are disposed substantially at angles $45-\theta/2°$ and $45+\theta/2°$, respectively, with respect to the optical axis of the light source. Accordingly, the first or second fly's eye lens can be disposed so that the optical axis thereof is perpendicular to the optical axis of the light source. With this construction, the use of a light refracting prism or a tilt arrangement in the optical axis of the light source is not required.

In still another embodiment of the polarized light illuminator according to the present invention, the polarization separation element is formed of crystal having birefringence, so as to separate randomly polarized light into first and second polarized light components. The first and second polarized light components are directed to the first or second fly's eye lens and then to the polarization conversion element so that the first and second polarized light components are unified into unidirectionally polarized light. With this construction, light from the light source can be converted into unidirectionally polarized light, with high efficiency, to illuminate the image display device with the light. Thus, the light from the light source can be effectively utilized.

In still another embodiment of the polarized light illuminator according to the present invention, by using a Wollaston prism as the polarization separation element, it is not necessary to tilt the optical axis of the first fly's eye lens with respect to the optical axis of the light source. This allows for a compact in line layout of optical components. In the case where the polarizing separation element is disposed between the first fly's eye lens and the second fly's eye lens, the optical paths of the first and second polarized light components separated by the polarization separation element are the same when they are incident on the second fly's eye lens. The light loss due to an increase in the size of a converged spot caused by the optical path difference can be suppressed. Moreover, with this construction, since the light source and the first fly's eye lens can be disposed close to each other, further reduction in light loss and device size is realized.

Using a flat plate formed of crystal having birefringence as the polarization separation element reduces the cost compared with the case of using a Wollaston prism.

In still another embodiment of the polarized light illuminator according to the present invention, a single flat plate is used, which has the polarization separation surface on the side thereof closer to the light source and the reflection surface on the other side. The number of components and the weight of the components can be reduced compared with the conventional construction which uses a large prism and a parallel flat plate. Also, the number of incident/output faces in the optical system can be reduced compared with conventional construction. This reduces light loss. Since only a thin flat plate constitutes the polarization separation element, an aberration generated when light passes through the flat plate is suppressed. This results in suppressing an increase in the size of the converged light spot on the second fly's eye lens, and thus reduces light loss.

In still another embodiment of the polarized light illuminator according to the present invention, the first and second flat plates having the polarizations separation surface and the reflection surface, respectively, are used as the polarization separation element. The first and second flat plates are substantially parallel to each other. With this construction, light emitted from the light source can be converted into unidirectionally polarized light with high efficiency, to illuminate the image display device with the light. Thus, the light from the light source can be effectively utilized. The weight of the components can be reduced compared with the conventional construction using a large prism and a parallel flat plate. Since only thin flat plates constitute the polarization separation element, an aberration generated when light passes through the flat plates is suppressed. This results in suppressing an increase in the size of the converged light spot on the second fly's eye lens, and thus reduces light loss.

In the polarized light illuminator according to the present invention, a film having the polarization separation surface and a flat plate having the reflection surface are disposed substantially parallel to each other to be used as the polarization separation element. With this construction, light emitted from the light source can be converted into unidirectionally polarized light with high efficiency, to illuminate the image display device with the light. Thus, the light from the light source can be effectively utilized. The weight of the components can be reduced compared with the conventional construction using a large prism and a parallel flat plate. Since the light component which has passed through the polarization separation surface formed on the film is directly incident on the reflection surface of the flat plate with no medium therebetween, the generation of an aberration can be further reduced. This results in suppressing an increase in the size of the converged light spot on the second fly's eye lens, and thus reduces light loss.

In the projection type image display apparatus according to the present invention, which includes the above-described polarized light illuminator, the loss of light for the illumination of the image display device can be reduced, and an increase in weight and cost can be suppressed.

Thus, the invention described herein makes possible the advantages of (1) providing a polarized light illuminator capable of reducing the loss of light for the illumination of an image display device such as a liquid crystal panel while suppressing an increase in weight and cost, and (2) providing a projection type image display apparatus using such a polarized light illuminator.

These and other advantages of the present invention will become apparent to those skilled in the art upon reading and understanding the following detailed description with reference to the accompanying figures.

DESCRIPTION OF THE PREFERRED EMBODIMENTS

Hereinbelow, the present invention will be described by way of example with reference to the accompanying drawings.

EXAMPLE 1

A projection type image display apparatus and a polarized light illuminator of Example 1 according to the present invention, as well as modifications thereof, will be described with reference to FIGS. 1 to 7.

Figure 1:
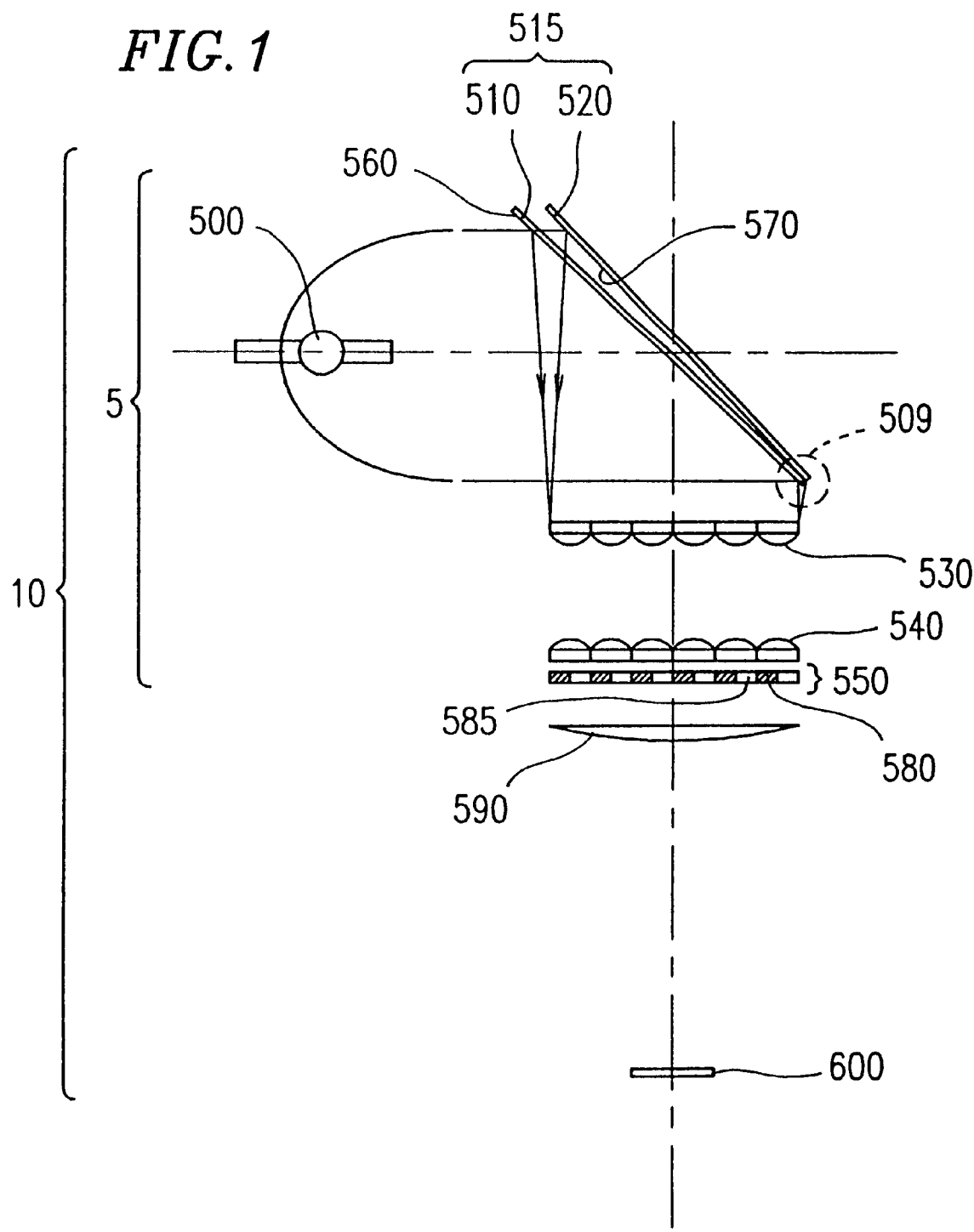
FIG. 1 is a schematic view of a projection type image display apparatus including a polarized light illuminator according to Example 1 of the present invention.
Figure 2:
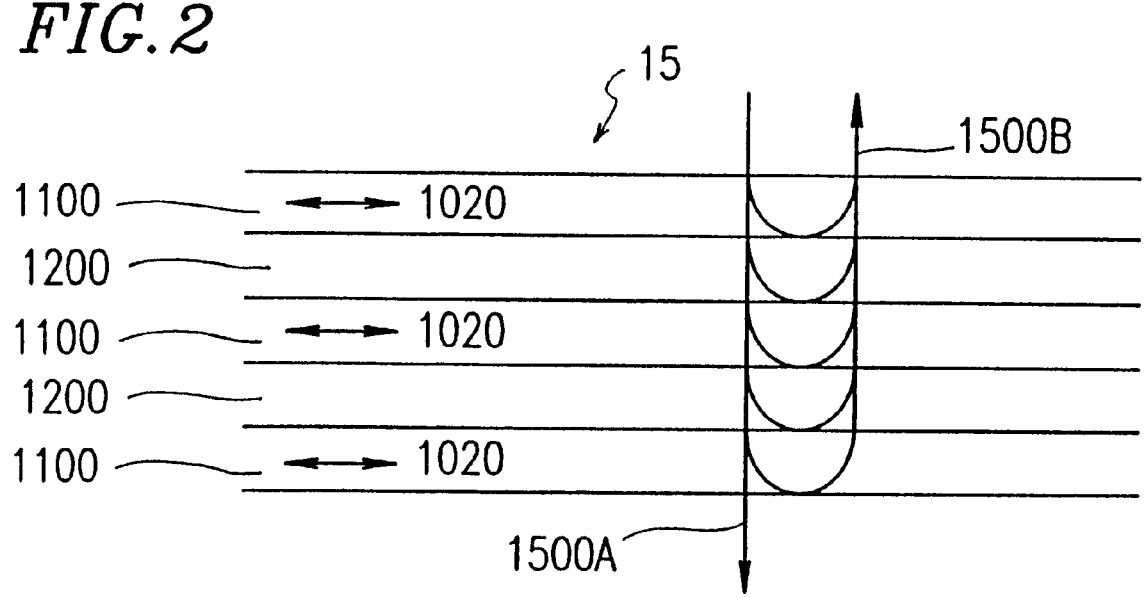
FIG. 2 is a schematic view of a polarizing element which can be used in Example 1.

Referring to FIG. 1, a projection type image display apparatus 10 includes a polarized light illuminator 5, a plano-convex lens 590, a liquid crystal display device 600, and a projection lens (not shown) for magnifying and projecting an image obtained by the liquid crystal display device 600. The polarized light illuminator 5 includes a light source 500, a polarization separation element 515, a first fly's eye lens 530, a second fly's eye lens 540, and a polarization conversion element 550. The polarization conversion element 550 includes λ/2 wave plates 580 and transparent regions 585. Light which has passed through the right half of each lens portion of the second fly's eye lens 540 passes through the corresponding transparent region 585, while light which has passed through the left half thereof passes through the corresponding λ/2 wave plate 580. The polarization separation element includes flat plates 510 and 520. The flat plates are formed of glass, for example.

The flat plate 510 includes a surface having the polarization separation function (a polarization separation surface 560) on the side closer to the light source 500. The flat plate 520 includes a surface having the reflection function (a reflection surface 570) on the side closer to the light source 500. Only a light flux having a first polarization direction (first polarized light) of randomly polarized light (i.e., unpolarized light) emitted from the light source 500 is reflected by the polarization separation surface 560 of the flat plate 510. A light flux having a second polarization direction perpendicular to the first polarization direction (second polarized light) passes through the flat plate 510, and is then reflected by the reflection surface 570 of the flat plate 520. The flat plates 510 and 520 are disposed at different angles from each other with respect to the optical axis of the light source 500. The flat plates 510 and 520 are also disposed so that a contact line 509 of a wedge occurs where the flat plates 510 and 520 are closer to the first fly's eye lens 530. Thus, the first and second polarized light fluxes with different polarization directions reflected by the flat plates 510 and 520 are incident on the first fly's eye lens 530 with the respective optical axes tilted from each other.

The first and second polarized light fluxes with different polarization directions incident on the first fly's eye lens 530 form different converged points adjacent to each other on the second fly's eye lens 540.

The first fly's eye lens has a function of converging incident light on the second fly's eye lens. In the normal use, light output from one of the plurality of lens portions of the first fly's eye lens forms a converged light spot on the corresponding lens portion of the second fly's eye lens. In this example, however, since two light fluxes (first polarized light and second polarized light) are incident on the first fly's eye lens at angles slightly different from each other due to the function of the polarization separation element, two converged light spots are formed on each lens portion of the second fly's eye lens. In other words, the first fly's eye lens has a function of separating two light fluxes with different polarization directions spatially from each other, in combination with the polarization separation element. The thus spatially separated two light fluxes with different polarization directions can then be converted into a light beam having substantially a single polarization direction by using the polarization conversion element 550.

The second fly's eye lens has a function of converging the light output from a point of each lens portion of the first fly's eye lens on the illumination object (the liquid crystal display device 600 in this example) in combination with the lens disposed close to the second fly's eye lens on the output side thereof.

The polarization conversion element 550 including the λ/2 wave plates 580 and the transparent regions 585 is disposed close to the second fly's eye lens 540 (on either the incident side or the output side thereof). The polarization conversion element is preferably disposed at a position where the two light fluxes having different polarization directions are spatially farthest from each other. In this example, the two fluxes are considered spatially farthest from each other at the converging points of these light fluxes. However, the second fly's eye lens must be disposed at such a position. Therefore, both the second fly's eye lens and the polarization conversion element need to be disposed in the vicinity of the converging points. In this example, preferably, the second fly's eye lens is used as the reference and the polarization conversion element is disposed on either the output side or the incident side of the second fly's eye lens.

Each of the λ/2 wave plates 580 is located to correspond to the output position of at least one of the first and second polarized light fluxes with different polarization directions which have passed through the second fly's eye lens 540. The λ/2 wave plate 580 rotates the polarization direction of the light which has passed therethrough by 90°. As a result, the entire light which has passed through the polarization conversion element 550 has a uniform polarization direction. The light output from the polarization conversion element 550 is directed to the liquid crystal display device 600 via the plano-convex lens 590 to illuminate the liquid crystal display device 600 with the light.

Hereinbelow, the components of the projection type image display apparatus 10 including the polarized light illuminator 5 of this example will be described in more detail.

The flat plate 510 having the polarization separation surface 560 may be produced by attaching a film of a polarization separation selective reflection element to a flat glass plate, by sandwiching such a film between flat glass plates, or by supporting such a film with a holder.

As the polarization separation selective reflection element, a polarizing element disclosed in Japanese Laid-Open Publication No. 57-158801 or a polarization selective reflection film (Optical Film D-BEF) manufactured by 3M Co., for example, can be used. Such a polarization separation selective reflection element has an optic axis in the plane thereof, and has a function of reflecting a linearly-polarized light component of incident light having a polarization direction identical to the direction of the optic axis and transmitting a linearly-polarized light component having a polarization direction perpendicular to the direction of the optic axis. The polarization separation selective reflection element is not limited to reflect the S-polarized light, but can be arranged so as to reflect the P-polarized light or other types of polarized light having an arbitrary tilt with respect to the optical axis of the P-polarized light.

Thus, the projection type image display apparatus of this example is effective for the case where a liquid crystal panel which displays images by modulating light polarization is used as the image display device, and the alignment direction of the liquid crystal molecules is tilted with respect to the polarization direction of the S-polarized light or the P-polarized light output from the polarization separation element. That is, the polarization direction of the polarized light component to be reflected by the polarization separation element is made identical to the alignment direction of the liquid crystal, and only the other polarized light component having a different polarization direction is converted by the polarization conversion element. In this way, light having the polarization direction identical to the alignment direction of the liquid crystal can be obtained for the liquid crystal panel.

The polarizing element disclosed in Japanese Laid-Open Publication No. 57-158801 mentioned above will be described with reference to FIG. 2.

The polarizing element denoted by reference numeral 15 includes layers which are provided with birefringence due to a molecular orientation (birefringent layer) and isotropic layers disposed alternately. Each of the birefringent layers has an optical axis 1020 in the plane thereof. The isotropic layers are made of a material having a refractive index identical to the refractive index of the birefringent layers for ordinary light (no) or extraordinary light (ne). Light incident on the polarizing element passes through a first layer 1100 which is a birefringent layer to enter a second layer 1200 which is an isotropic layer. When the refractive index of the second layer 1200 is identical to the refractive index of the first layer 1100 for ordinary light, an ordinary light component 1500A of the incident light passes through the second layer 1200, while part of an extraordinary light component 1500B is reflected from the second layer 1200 due to the difference in the refractive index. In this way, part of the extraordinary light 1500B is reflected at each of the alternately-disposed isotropic layers. As a result, the ordinary light component 1500A passes through the element, while the extraordinary light component 1500B is reflected from the element.

Alternatively, the polarization separation selective reflection element may be made of cholesteric liquid crystal. In this case, a $\lambda/4$ wave plate is disposed between the polarization separation surface 560 and the reflection surface 570, and the polarization conversion element 550 includes $\lambda/4$ wave plates, in place of the $\lambda/2$ wave plates, disposed close to the second fly's eye lens 540 (on either the incident side or the output side thereof). The cholesteric liquid crystal has a function of reflecting left circularly-polarized light and transmitting right circularly-polarized light, for example. The $\lambda/4$ wave plate has a function of converting incident linearly-polarized light into circularly-polarized light and converting circularly-polarized light into linearly-polarized light before allowing the light to pass therethrough. Accordingly, the right circularly-polarized light which has passed the polarization separation surface 560 (cholesteric liquid crystal), for example, is converted into linearly-polarized light by passing through the $\lambda/4$ wave plate, and the linearly-polarized light is reflected by the reflection surface 570, converted again into the right circularly-polarized light by the $\lambda/4$ wave plate, and then passes through the polarization separation surface 560 (cholesteric liquid crystal). As a result, with the above construction, the circularly-polarized light reflected by the polarization separation surface 560 and the reflection surface 570 are converted into linearly-polarized light. Thus, the polarization direction can be unified.

In the case where the polarization separation film composed of an ordinary dielectric multilayer film is used as the polarization separation selective reflection element, since such a polarization separation film has an isotropy in the plane of the film, it is difficult to efficiently reflect or transmit polarized light having an arbitrary polarization direction. Accordingly, when such the polarization separation film is used as the polarization separation selective reflection element, the polarization directions of both of the two polarized light components, having different polarization directions reflected by the polarization separation element, must be converted by the polarization conversion element including wave plates. This is disadvantageous in that some of light is absorbed when it passes through the wave plate and that light is lost during the polarization conversion. However, a polarization separation surface having an optic axis in the plane thereof as used in this example reflects linearly-polarized light having a polarized direction identical to the direction of a specific reflection axis of the polarization separation surface independent of the incident direction of the light incident on the polarization separation surface, and transmits linearly-polarized light having a polarization direction perpendicular to the reflection axis. This allows for efficient polarization separation even when light emitted from the light source mostly scatters.

The flat plate 510 having the polarization separation surface 560 may be produced by forming a polarization separation film composed of a dielectric multilayer film on a flat glass plate as in the conventional case. In general, the polarization separation film composed of a dielectric multilayer film can be more easily designed so as to reflect the S-polarized light. Therefore, in the case of using the polarization separation film composed of a dielectric multilayer film as the polarization separation surface, the film should be desirably designed so as to reflect the S-polarized light.

The flat plate 520 having the reflection surface 570 can be obtained by evaporating metal such as aluminium on a surface of a flat glass plate, for example, as in the conventional case. Alternatively, the reflection surface 570 may be formed of a dielectric multilayer film.

The polarized light illuminator of this example shown in FIG. 1 realizes the conversion of randomly polarized light emitted from the light source into unidirectionally polarized light. Thus, light from the light source 500 can be effectively utilized when the liquid crystal display device 600 of a birefringence mode or a twisted mode, where images are displayed by modulating the polarization of light, is used for a projection type liquid crystal display apparatus.

In the polarized light illuminator of this example shown in FIG. 1, the polarization separation element including the flat plate 510 with a surface having the polarization separation function and the flat plate 520 with a surface having the reflection function is used to achieve the polarization separation. This reduces the cost and the weight of the device, compared with the case of using a large prism or a wedge type prism.

Figure 19:
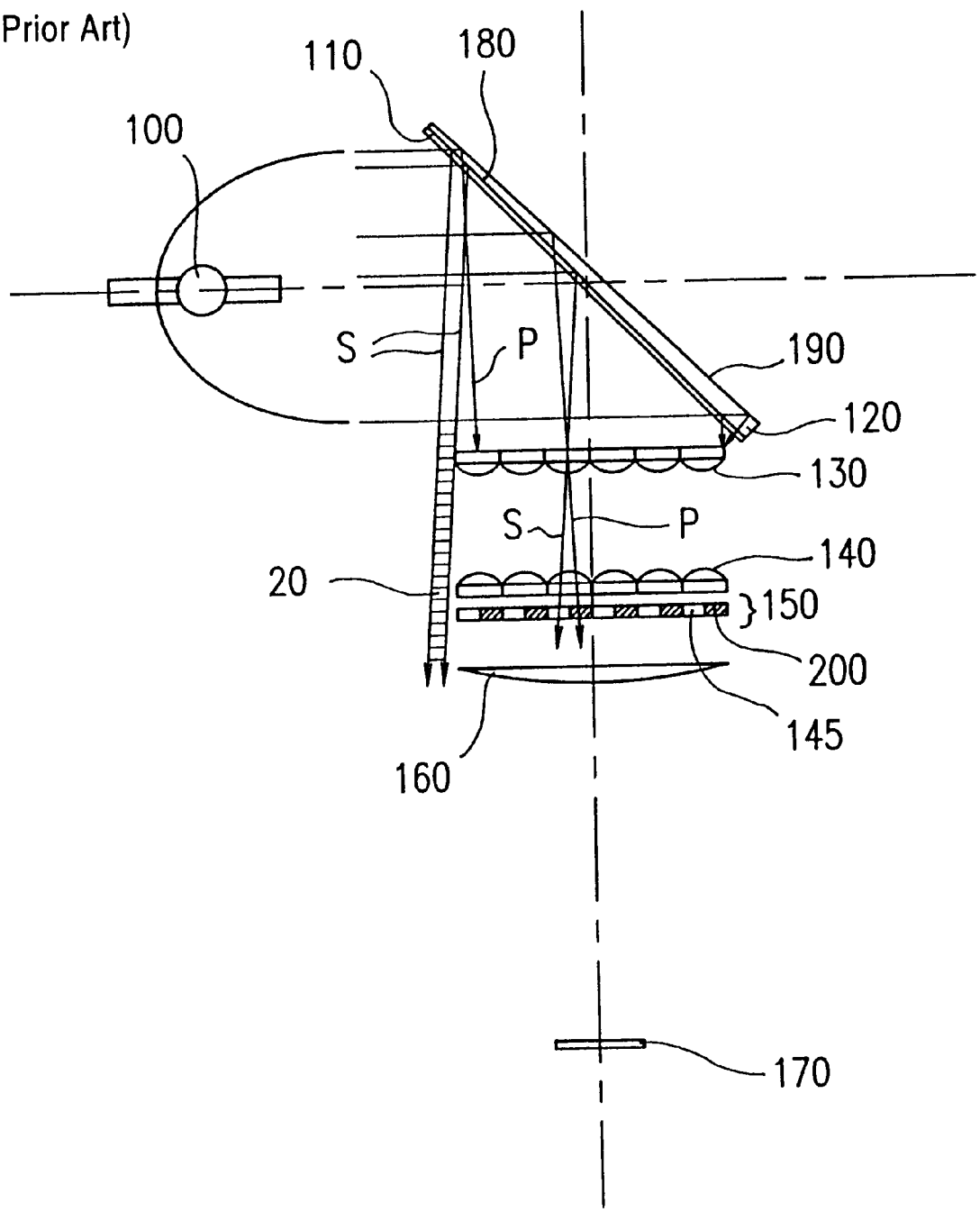
FIG. 19 is a schematic view of a conventional polarized light illuminator using a flat plate and a wave type prism.
Figure 20:
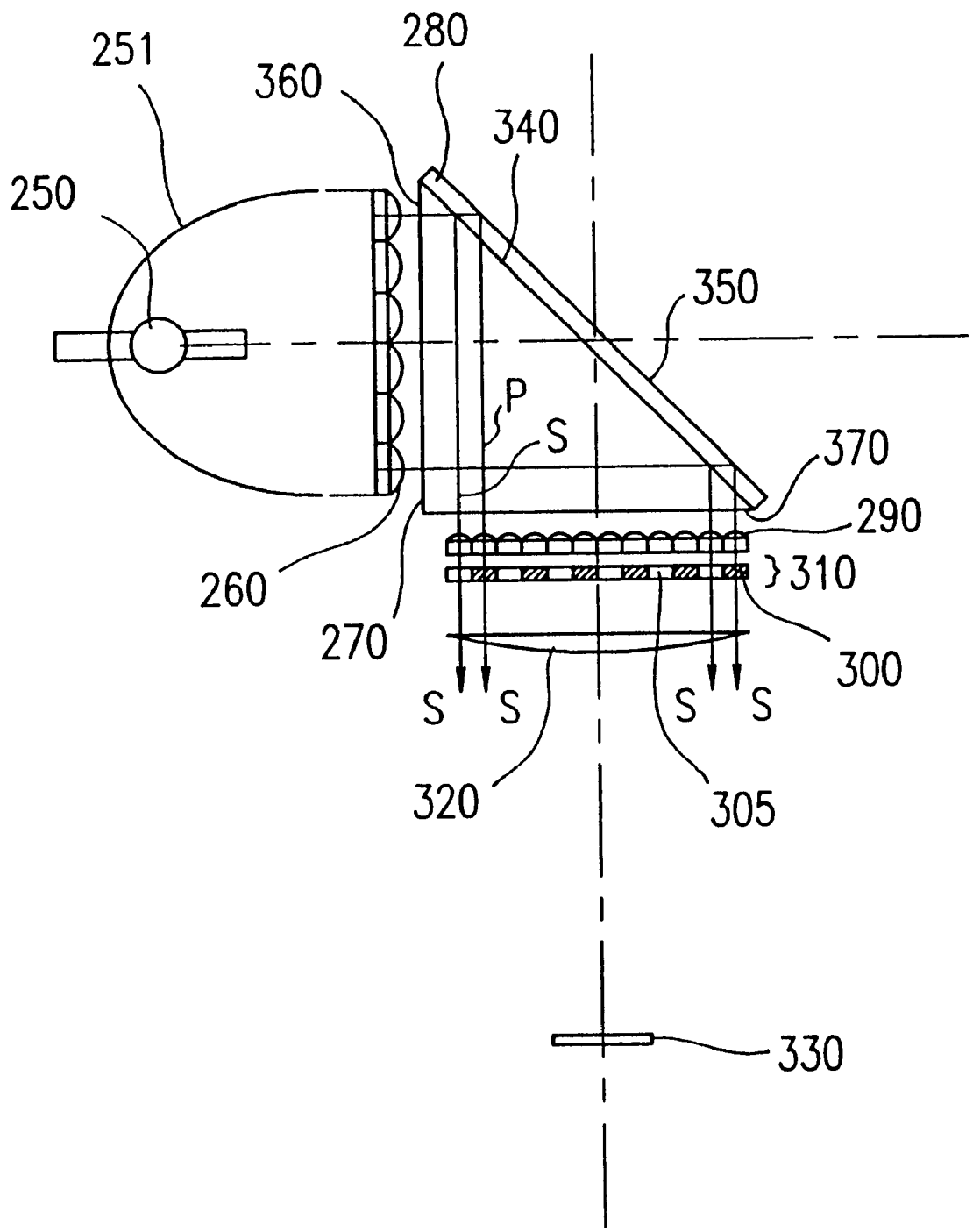
FIG. 20 is a schematic view of a conventional polarized light illuminator using a flat plate and a rectangular prism.

In the polarized light illuminator of this example shown in FIG. 1, when the first and second polarized light fluxes with different polarization directions, for example, are incident on the first fly's eye lens 530, the optical paths of the first and second polarized light fluxes intersect with each other on the first fly's eye lens 530, unlike the case of using the polarization separation element composed of the flat plate 110 and the wedge type prism 120 as shown in FIG. 19. This reduces the loss of light directed to the liquid crystal display device 600.

The top portion of the wedge type prism is beveled to protect it from cracking, breaking, and the like at the end faces. Such beveling increases the distance between the surface having the polarization separation function and the surface having the reflection function. As a result, the intersection between the optical paths of the light reflected by the polarization separation surface and the light reflected by the reflection surface fails to be located right on the first fly's eye lens, thereby generating a light loss. In the polarized light illuminator of this example shown in FIG. 1, however, the polarization separation surface and the reflection surface are formed on the two flat plates 510 and 520. Since such flat plates can easily be made thinner, the distance between the polarization separation surface and the reflection surface can be made small. The light loss is therefore reduced compared with the case of using the wedge type prism.

Hereinbelow, modifications of Example 1 will be described.

Figure 3:
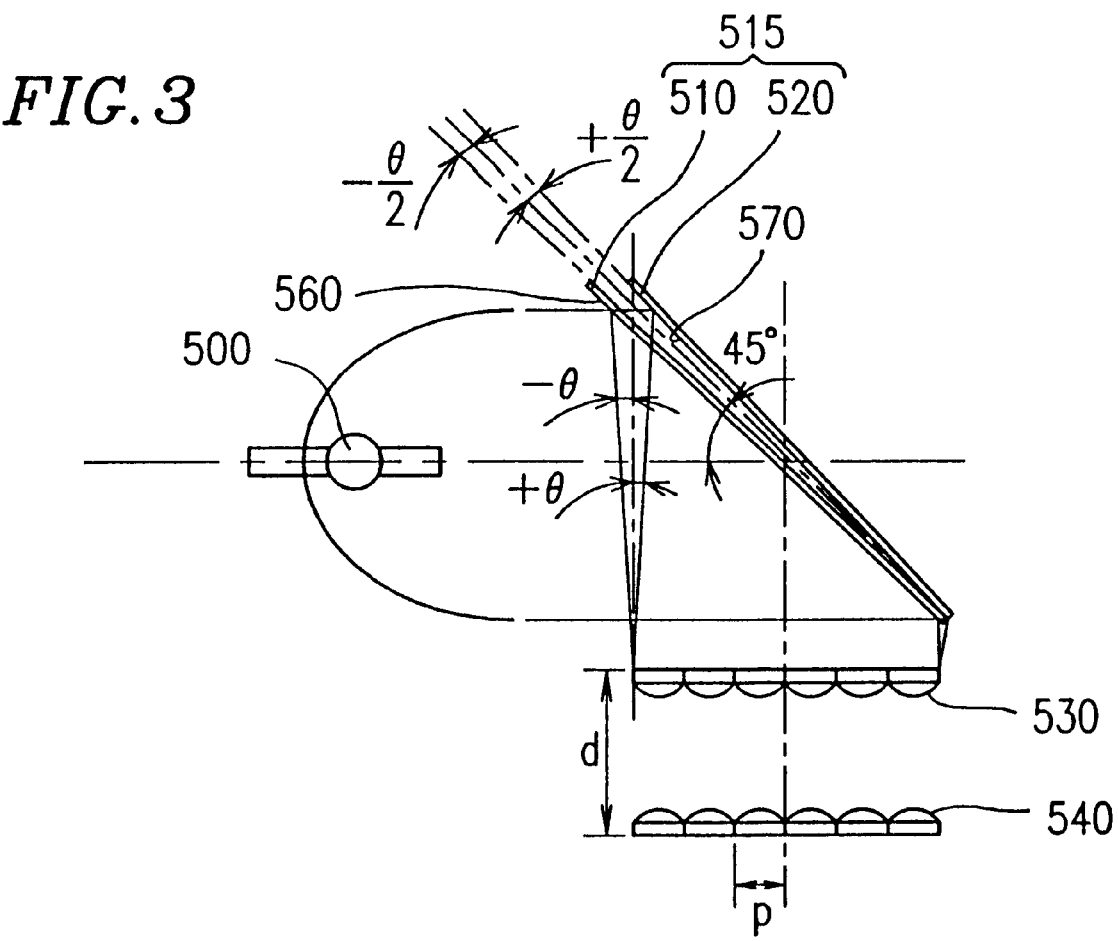
FIG. 3 is a schematic view illustrating the position of a polarization separation element with respect to the optical axis of a light source in Example 1.

Referring to FIG. 3, the flat plates 510 and 520 are disposed at about an angle θ represented by expression (1) below.

$$\theta = \tan^{-1}(p/4d) \qquad (1)$$

wherein d denotes the distance between the first fly's eye lens 530 and the second fly's eye lens 540, and p denotes the lens pitch of the second fly's eye lens 540 in the direction where converged spots of the light reflected by the polarization separation surface 560 and the light reflected by the reflection surface 570 are formed side by side. For example, when d is 38 mm and p is 8 mm, θ is about 3°.

With the above construction, the converged light spots of the first and second polarized light fluxes having different polarization directions output from the first fly's eye lens 530 are formed on the second fly's eye lens 540 side by side at a pitch of about p/2. The diameter of the converged light spot may increase if light emitted from the light source has poor parallelism. However, in this example, as long as the diameter of the converged light spot is equal to or less than p/2, such light can be readily introduced into the second fly's eye lens 540. This reduces light loss. Light loss may also be generated when light is incident on the polarization conversion element 550 (FIG. 1) disposed near the second fly's eye lens 540. In this example, such light loss can also be reduced.

The flat plates 510 and 520 may be disposed at angles 45−θ/2° and 45+θ/2°, respectively, with respect to the optical axis of the light source 500 as shown in FIG. 3. This makes it possible to dispose the first fly's eye lens 530 or the second fly's eye lens 540 so that the optical axis thereof is perpendicular to that of the light source 500. With this construction, light can be introduced into the fly's eye lens at a desired angle without the use of a light refracting prism or a tilt arrangement in the optical axis of the light source. This allows for the layout of a compact optical system without increasing the cost.

Figure 4:
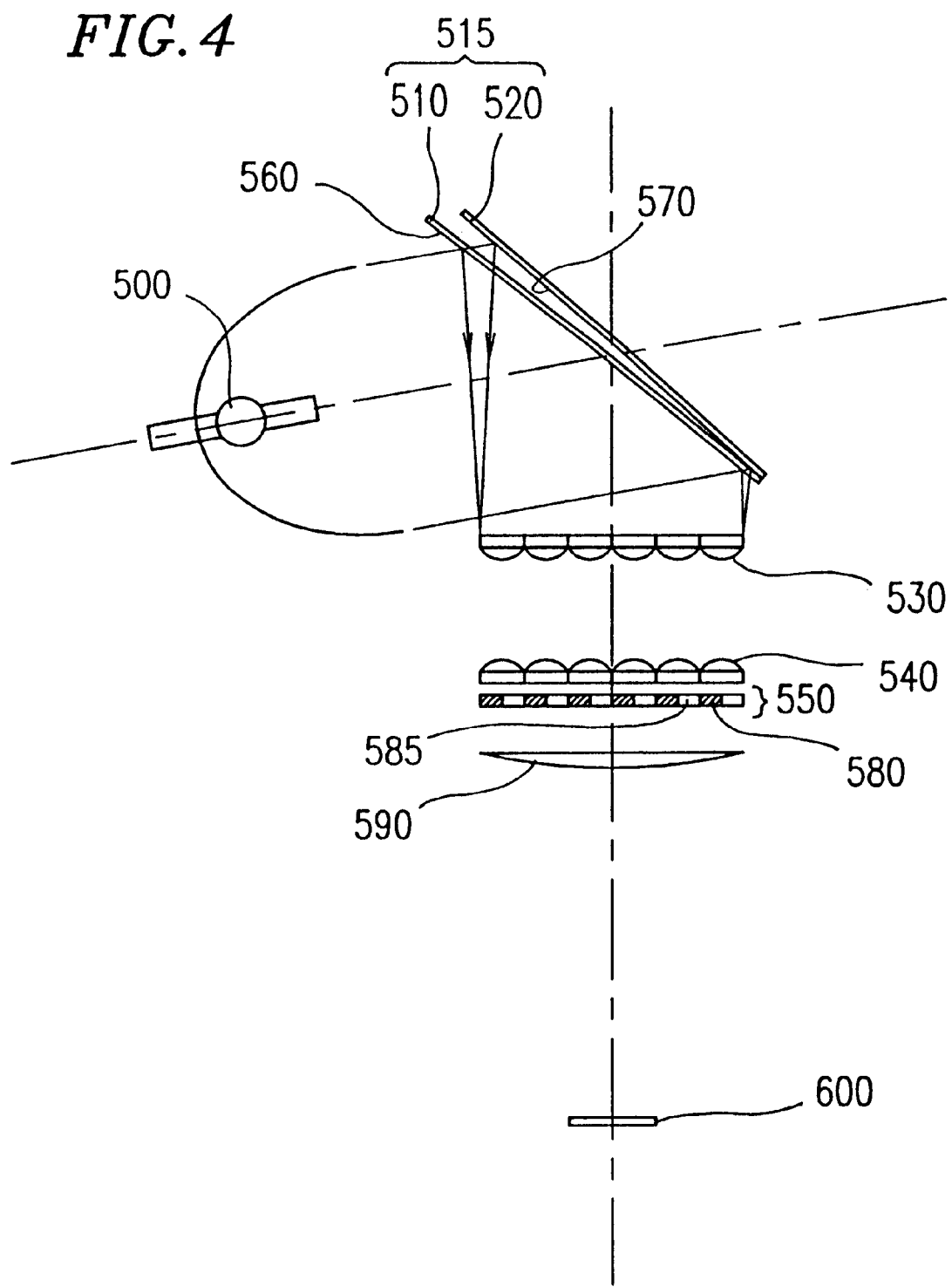
FIG. 4 is a schematic view of a modification of Example 1 where the incident angle of light on the polarization separation element is changed.

If the polarization separation surface of the flat plate 510 fails to have desired characteristics when the incident angle of 45±θ/2° is adopted, an arbitrary incident angle can be adopted as shown in FIG. 4. That is, an arbitrary angle other than 45° can be used as the center angle for the two flat plates. For example, tilt angles of 70±θ/2° or 30±θ/2° with respect to the optical axis of the light source may be adopted for the flat plates 510 and 520.

The first fly's eye lens 530 is preferably disposed at a position where the optical path of the light reflected by the flat plate 510 and the optical path of the light reflected by the flat plate 520 intersect with each other. In the conventional polarized light illuminator shown in FIG. 19, it is not possible to dispose the first fly's eye lens 130 at a position where the optical axes intersect with each other, resulting in the generation of light loss. This is a problem specific to the case where the polarization separation element is formed of the flat plate 110 and the wedge type prism 120. In the construction shown in FIG. 1, the flat plates can be disposed so that the above-described conditions are satisfied. Thus, the light loss can be reduced.

Figure 5:
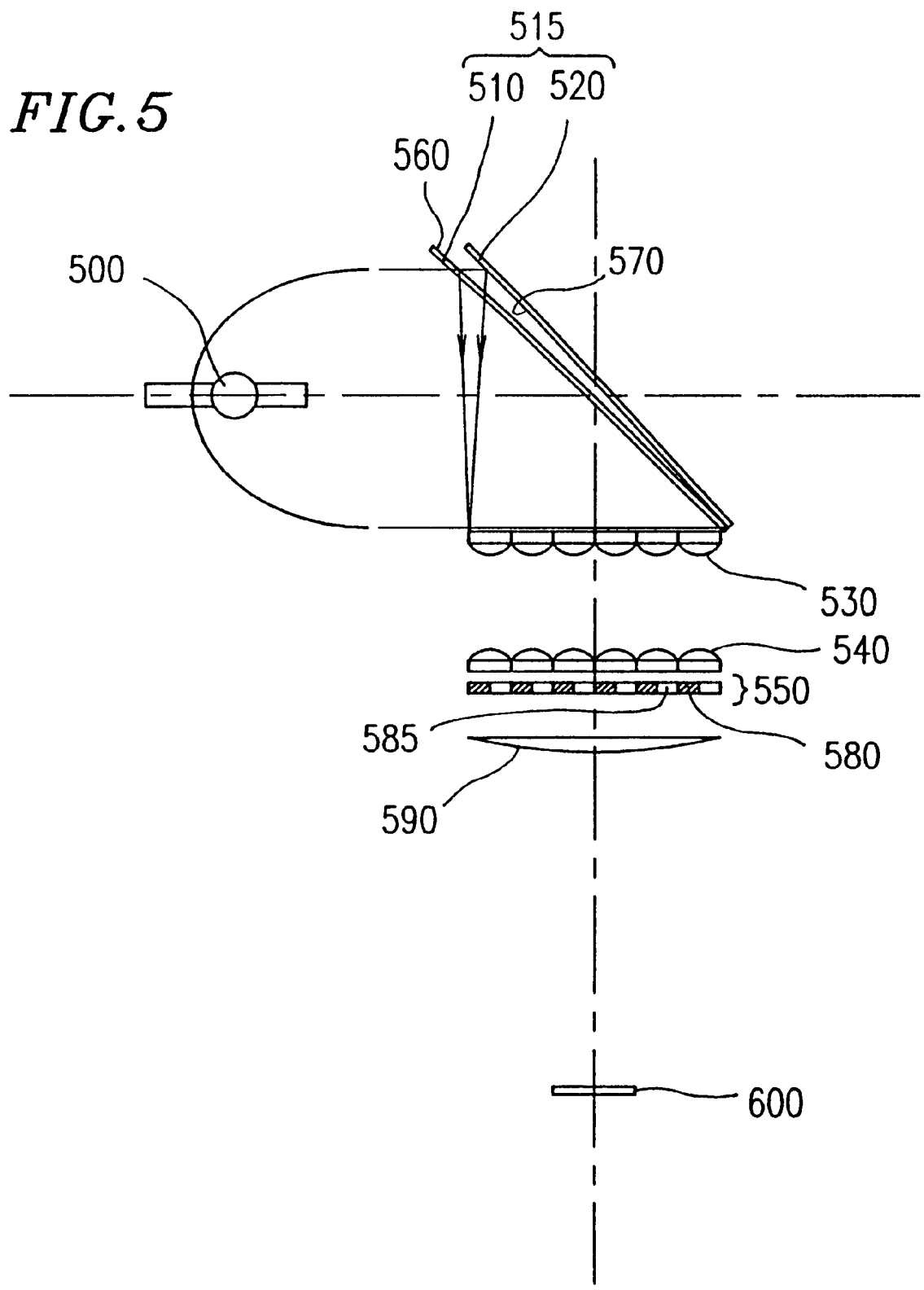
FIG. 5 is a schematic view of an alternative polarized light illuminator of Example 1.

Referring to FIG. 5, the polarization separation surface 560 and the reflection surface 570 may be formed on the surfaces of the flat plates 510 and 520 which are facing each other, to reduce the distance between the polarization separation surface 560 and the reflection surface 570. In this case, the optical paths of light reflected by the polarization separation surface 560 and light reflected from the reflection surface 570 intersect with each other at a position closer to the flat plate 510, compared with the case shown in FIG. 1. This makes it possible to dispose the first fly's eye lens 530 at a position closer to the flat plate 510 and thus reduce the loss of light incident on the first fly's eye lens 530.

The polarization conversion element 550 may be obtained by partly attaching the wave plate 580 to a surface of a flat glass plate. The pitch of the formation of portions where the wave plate is attached should be roughly identical to a half of a lens pitch p (p/2) of the second fly's eye lens 540 in the direction where the converged spots of two light fluxes separated from each other by the polarization separation element are formed side by side on the second fly's eye lens 540 via the first fly's eye lens 530. Alternatively, the wave plate may be attached so that both of the two light fluxes reflected by the polarization separation surface 560 and the reflection surface 570 are converted into light having an arbitrary polarization direction.

The polarization conversion element 550 is desirably disposed at a position where the spot of light output from the first fly's eye lens 530 is minimum. The polarization conversion element 550 may be disposed close to the second fly's eye lens 540 on the input side thereof.

In the projection type liquid crystal image display apparatus of this example, the first fly's eye lens 530, the second fly's eye lens 540, and the plano-convex lens 590 are used to illuminate the liquid crystal display device 600 with light. Alternatively, the plano-convex lens 590 may be omitted by using eccentric lenses for the lens portions of the first fly's eye lens 530 and the second fly's eye lens 540. The plano-convex lens has a function of converging light output from each lens portion of the first fly's eye lens on the illumination object in combination with the second fly's eye lens. A projection type image display apparatus without using the plano-convex is also possible in the case where the first fly's eye lens and the second fly's eye lens are made eccentric to each other and only the second fly's eye lens is used to converge light from the first fly's eye lens on the illumination object by changing the focal distance of the second fly's eye lens from that used in this example.

An elliptic reflector may be used as the reflector for the light source, instead of the illustrated parabolic reflector.

Figure 21:
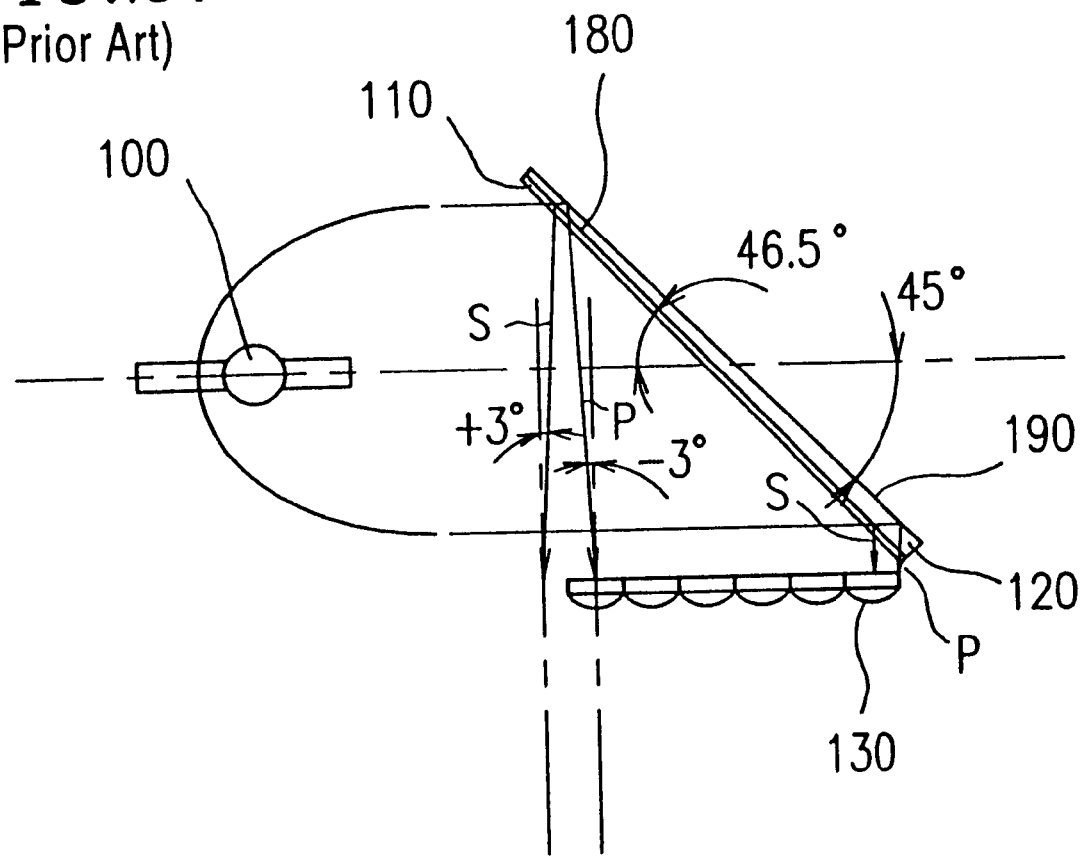
FIG. 21 is a schematic view illustrating the optical paths of P-polarized light and S-polarized light of the conventional polarized light illuminator shown in FIG. 19.
Figure 22:
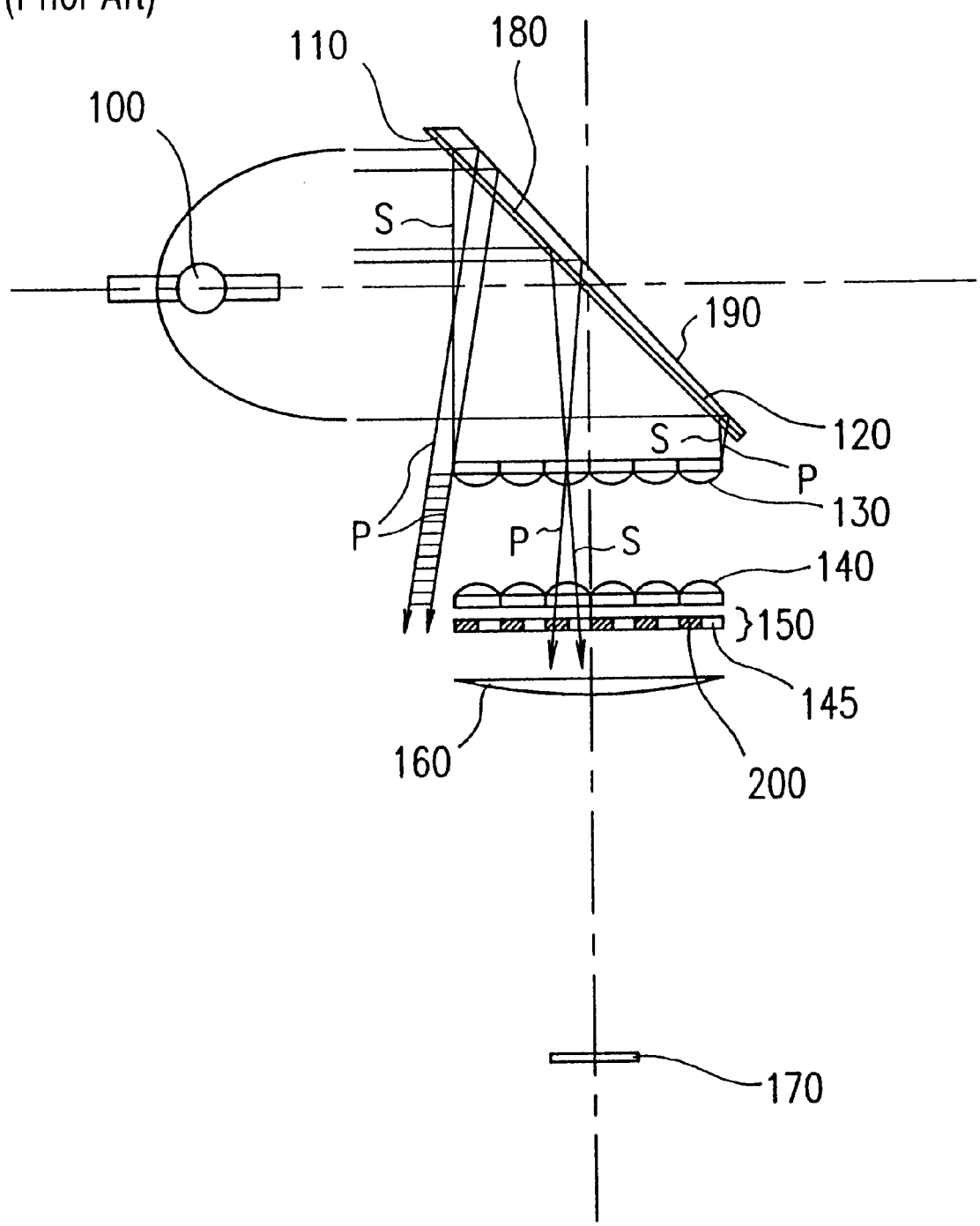
FIG. 22 is a schematic view of a modification of the conventional polarized light illuminator of FIG. 19 where the wedge type prism is disposed in reverse.

In this example (as shown in FIG. 21, for the conventional example) the polarization separation element can be disposed between the first fly's eye lens and the second fly's eye lens if two light fluxes having separated angles and having different polarization directions proceed in directions away from each other.

Figure 6:
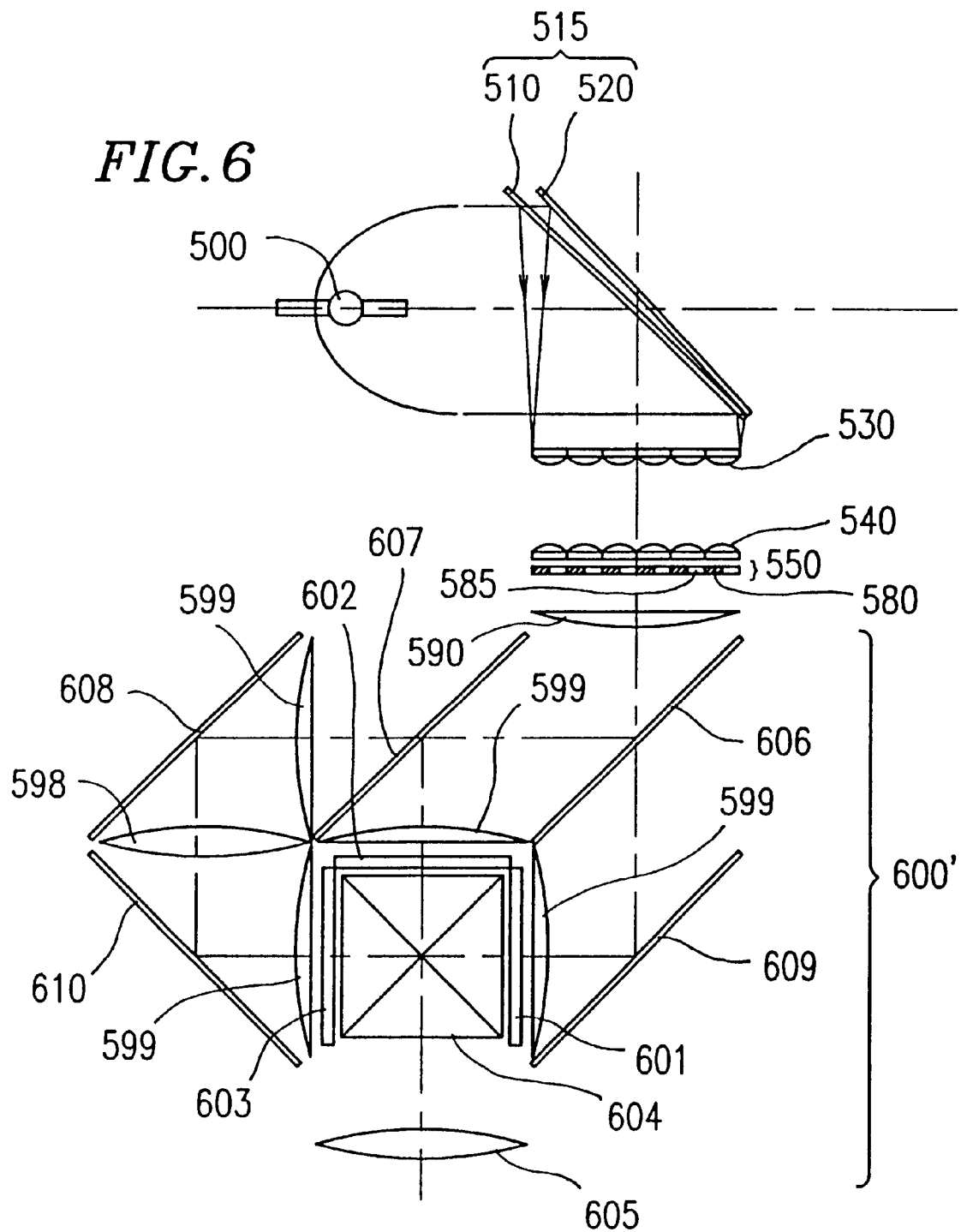
FIG. 6 is a schematic view of the projection type image display apparatus according to the present invention, including the polarized light illuminator of Example 1 and a transmissive image display panel.
Figure 7:
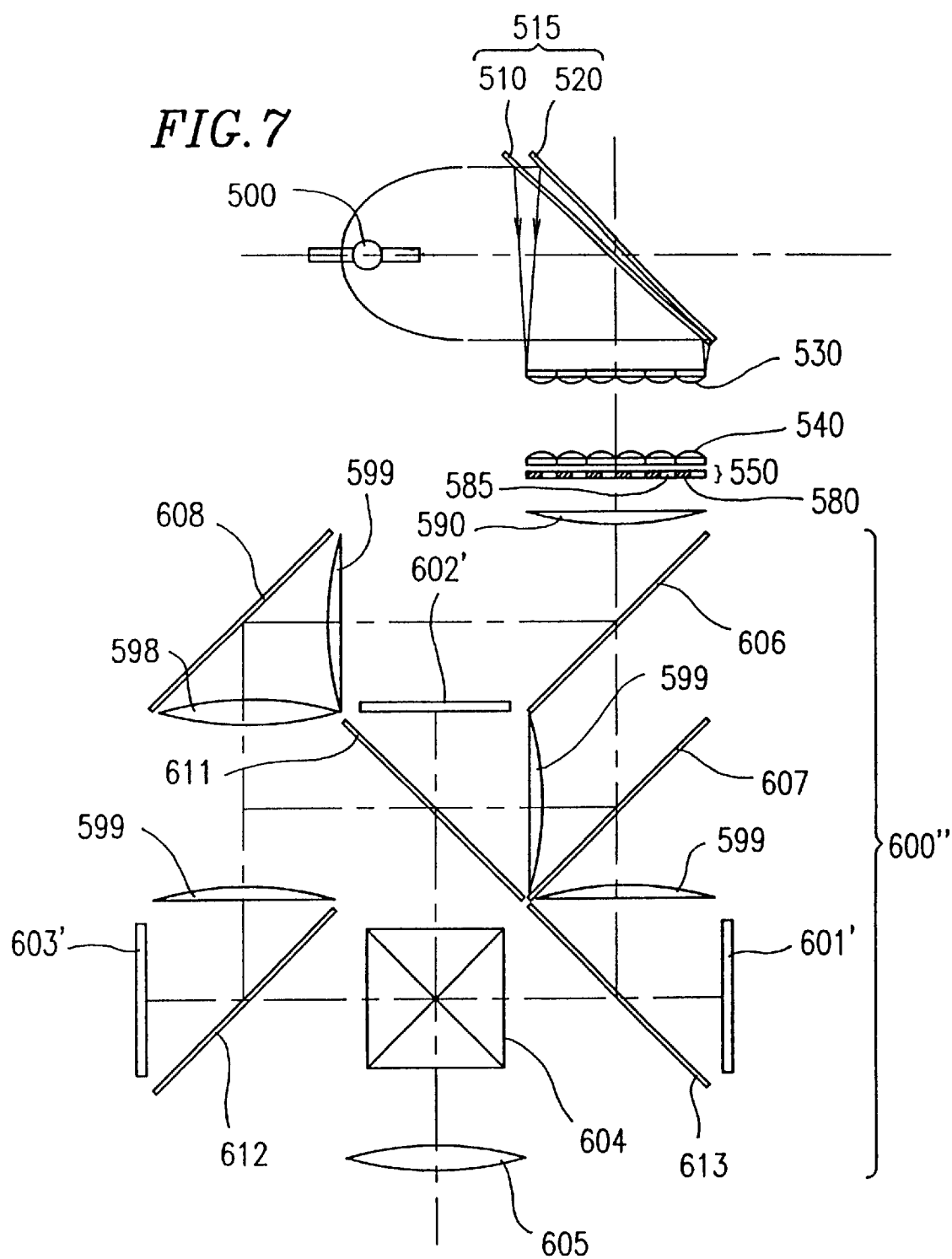
FIG. 7 is a schematic view of the projection type image display apparatus according to the present invention, including the polarized light illuminator of Example 1 and a reflective image display panel.

The liquid crystal display device 600 of the projection type liquid crystal image display apparatus of this example can be selected from a variety of constructions, such as that including a transmissive liquid crystal panel shown in FIG. 6 and that including a reflective liquid crystal panel shown in FIG. 7.

Referring to FIG. 6, a liquid crystal display device 600' includes a convex lens 598, a plano-convex lens 599, transmissive liquid crystal panels 601, 602, and 603, a cross dichroic prism 604, dichroic mirrors 606 and 607, mirrors 608, 609, and 610, and a projection lens 605. The dichroic mirror 606 reflects blue (B) light beam and green (G) light beam, and the dichroic mirror 607 reflects green (G) light beam.

Light which has passed through the plano-convex lens 590 is incident on the dichroic mirrors 606 and 607 to be separated into red (R), green (G), and blue (B) light beams. The R, G, and B light beams are incident on the liquid crystal panels 601, 602, and 603, respectively, via the mirrors, the convex lens 598, and the plano-convex lens 599, so that the polarization directions of these light beams are rotated depending on the respective image signals. The light beams which have passed through the liquid crystal panels 601, 602, and 603 are then synthesized by the cross dichroic prism 604, to reach the projection lens 605. The plano-convex lens 599 has a function of converting light which has passed through the principal point of the plano-convex lens 590 (the center of the lens) into parallel light and guiding the parallel light to be incident on the liquid crystal panel. The convex lens 598 has a function of re-converging the light including an image at each lens portion of the first fly's eye lens converged with the plano-convex lens 599 disposed on the incident side of the mirror 608 on the liquid crystal panel. The convex lens 598 may be a plano-convex lens. The plano-convex lens 599 may be a convex lens.

Referring to FIG. 7, a liquid crystal display device 600" includes a convex lens 598, a plano-convex lens 599, reflective liquid crystal panels 601', 602', and 603', polarization separation elements 611, 612, and 613, a cross dichroic prism 604 for color synthesis, dichroic mirrors 606 and 607, a projection lens 605, and a mirror 608.

Light which has passed through the plano-convex lens 590 is incident on the dichroic mirrors 606 and 607 to be separated into red (R), green (G), and blue (B) light beams. These light beams are incident on the liquid crystal panels 601', 602', and 603', respectively, via the convex lens 598, the plano-convex lens 599, the polarization separation elements 611, 612, and 613, and the mirror 608, to be reflected after the polarization state is modulated depending on image signals. The light reflected from the liquid crystal panels 601', 602', and 603' are incident again on the corresponding polarization separation elements. Only the light beams of the incident light of which polarization direction is rotated by the reflective liquid crystal display panel pass through the corresponding polarization separation elements, and are synthesized by the cross dichroic prism 604, to reach the projection lens 605.

Color display is realized by using the liquid crystal display device 600' or 600" shown in FIGS. 6 and 7.

EXAMPLE 2

A projection type image display apparatus and a polarized light illuminator of Example 2 according to the present invention, as well as modifications thereof, will be described with reference to FIGS. 8 to 13.

Figure 8:
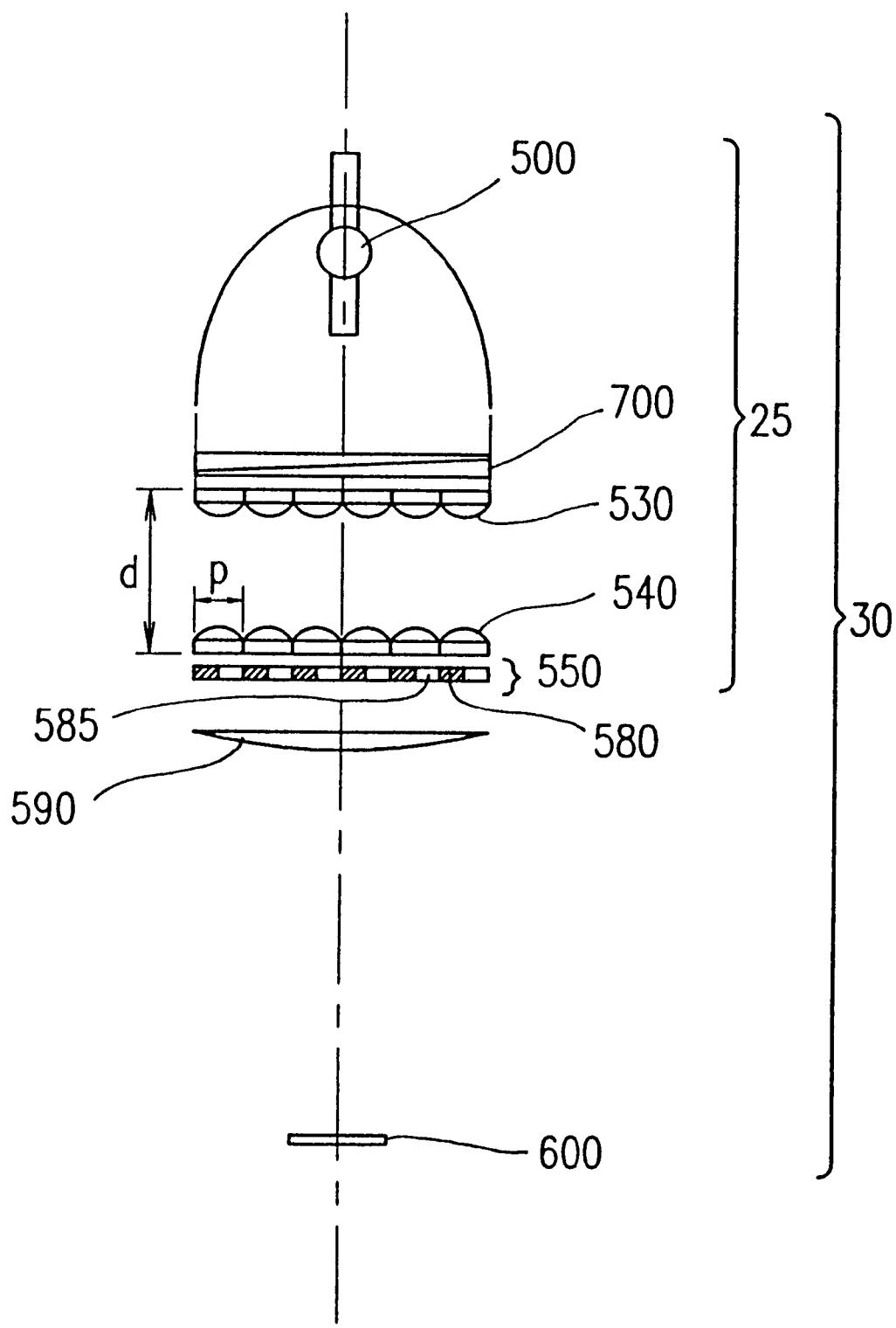
FIG. 8 is a schematic view of a projection type image display apparatus including a polarized light illuminator according to Example 2 of the present invention.

Referring to FIG. 8, a projection type image display apparatus 30 includes a polarized light illuminator 25, a plano-convex lens 590, a liquid crystal display device 600, and a projection lens (not shown) for magnifying and projecting an image obtained by the liquid crystal display device 600. The polarized light illuminator 25 includes a light source 500, a polarization separation element 700, a first fly's eye lens 530, a second fly's eye lens 540, and a polarization conversion element 550. The polarization conversion element 550 includes λ/2 wave plates 580 and transparent regions 585. Light which has passed through the right half of each lens portion of the second fly's eye lens 540 passes through the corresponding transparent region 585, while light which has passed through the left half thereof passes through the corresponding λ/2 wave plate 580.

Light emitted from the light source 500 is incident on the polarization separation element 700 made of crystal having birefringence. In this example, a Wollaston prism is used as the polarization separation element 700.

The light incident on the Wollaston prism as the polarization separation element 700 is separated into two light fluxes having polarization directions perpendicular to each other and directions of optical axes different from each other.

The two light fluxes having different optical axial angles output from the polarization separation element 700 are incident on the first fly's eye lens 530, to form respective converged points side by side on the second fly's eye lens 540. The converged light fluxes are then incident on the polarization conversion element 550 disposed on the output side of the second fly's eye lens 540, so that the polarization directions are unified. The resultant light is then directed to the liquid crystal panel 600 via the plano-convex lens 590 to illuminate the liquid crystal panel 600 with the light.

Hereinbelow, the components of the projection type image display apparatus 30 including the polarized light illuminator 25 of this example will be described in more detail.

The crystal used for the polarization separation element 700 may be any crystal having birefringence, such as lithium niobate, potassium phosphate titanate, and quartz. In this example, the polarization separation element 700 is composed of a Wollaston prism which functions to separate incident light into two polarized light components of which optical axes are tilted by about ±θ° with respect to the optical axis of the light source. The angle θ is represented by expression (2) below.

$$\theta = \tan^{-1}(p/4d) \quad (2)$$

wherein d denotes the distance between the first fly's eye lens 530 and the second fly's eye lens 540, and p denotes the lens pitch of the second fly's eye lens 540 in the direction where the converged spots of the light fluxes separated by the polarization separation surface 700 are formed side by side on the second fly's eye lens 540. For example, when d is 38 mm and p is 8 mm, θ is about 3°.

With the above construction, the converged light spots of the two light fluxes having different polarization directions output from the first fly's eye lens 530 are lined side by side on the second fly's eye lens 540 at a pitch of about p/2. If light emitted from the light source has poor parallelism, the diameter of the converged spot of the light may increase. However, in this example, as long as the diameter of the converged light spot is equal to or less than p/2, light can be well introduced into the second fly's eye lens 540. This reduces light loss. Light loss may also be generated when light is incident on the polarization conversion element 550 disposed near the second fly's eye lens 540. In this example, such light loss can also be reduced.

The polarization conversion element 550 may be obtained by partly attaching the wave plate 580 to a surface of a flat glass plate. The pitch of the formation of portions where the wave plate is attached should be roughly identical to a half of a lens pitch p (p/2) of the second fly's eye lens 540 in the direction where the converged light spots of two light fluxes separated from each other by the polarization separation element 700 are formed side by side on the second fly's eye lens 540. Alteratively, both of the two light fluxes separated by the polarization separation element 700 may be converted into polarized light having an arbitrary polarization direction.

The polarization conversion element 550 is desirably disposed at a position where the spot of light output from the first fly's eye lens 530 is minimum. The polarization conversion element 550 may also be disposed close to the second fly's eye lens 540 on the incident side thereof.

Thus, in the polarized light illuminator of Example 2 shown in FIG. 8, as in Example 1, light from the light source 500 can be effectively utilized when the image display device 600 is a liquid crystal panel of a birefringence mode or a twisted mode where images are displayed by modulating the polarization of light.

In this example, the optical components including the light source 500, the polarization separation element 700, the first fly's eye lens 530, and the second fly's eye lens 540 are disposed in line. Thus, a compact device can be realized.

When the polarization separation element has the polarization separation surface and the reflection surface, light which has passed through the polarization separation surface and has been reflected from the reflection surface passes again through the polarization separation surface. This causes light loss due to the absorption of light by the reflection surface and unnecessary polarization separation by the polarization separation surface when the reflected light returns therethrough. In the polarized light illuminator of Example 2, however, the polarization separation element is made of crystal having birefringence, having no polarization separation surface or reflection surface. Therefore, the light loss as described above can be reduced.

Alternatively, the polarization separation element may be rotated around the optical axis of the light source in the plane, to separate the incident light into two light components. The polarization direction of only one of the two light components is converted by a wave plate or the like, so as to unify the polarization directions of the two light components. With this construction, an increase in light loss is prevented irrespective of the alignment direction of liquid crystal of the liquid crystal panel.

By constructing the polarization separation element so as to satisfy expression (2), light loss can be reduced even if light emitted from the light source has poor parallelism and as a result the diameter of the converged light spot of the light increases.

In the case of using a Wollaston prism as the polarization separation element, no optical path difference is generated between the two light fluxes having different polarization directions when the two light fluxes reach the second fly's eye lens 540. This suppresses an increase in the diameter of the two light spots on the second fly's eye lens 540.

Hereinbelow, modifications of Example 2 will be described.

Figure 9:
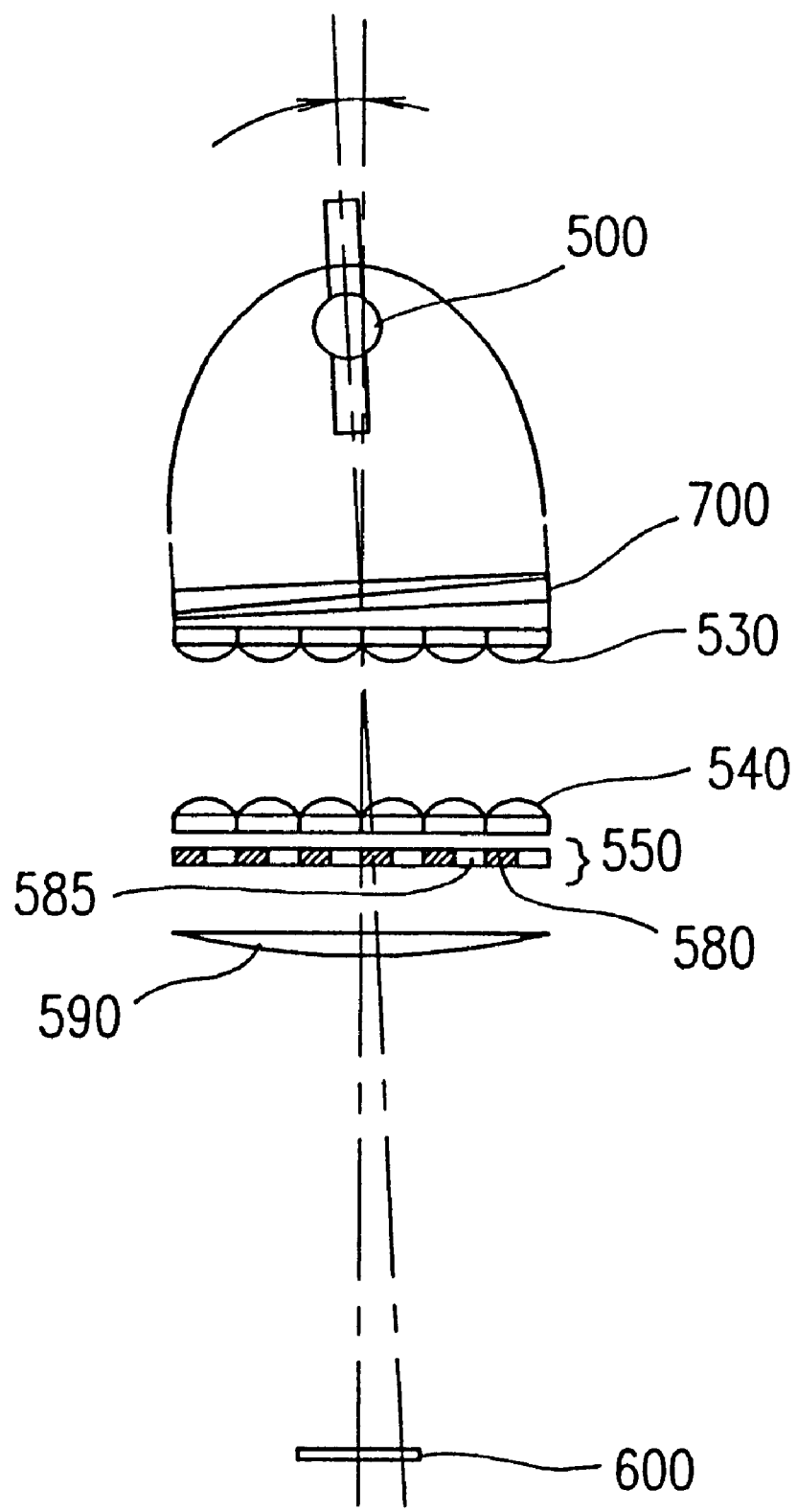
FIG. 9 is a schematic view illustrating the case where the optical axis of a light source is tilted in Example 2.

As the polarization separation element 700, a Rochon prism and the like may be used. In this case, however, the use of a light refracting prism, a tilt arrangement in the optical axis of the light source 500 as shown in FIG. 9, and the like are required.

Figure 10:
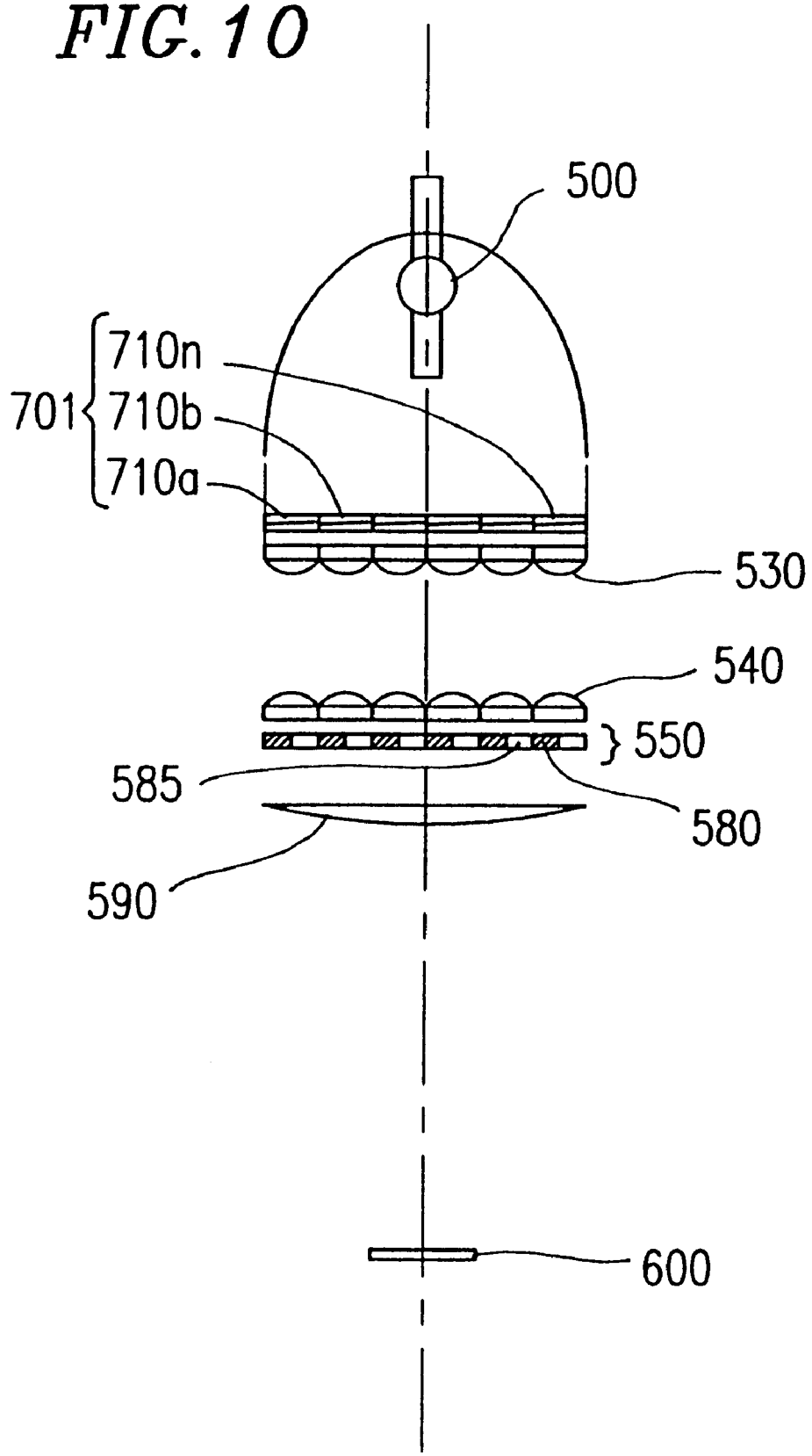
FIG. 10 is a schematic view illustrating a modification of Example 2 where a plurality of Wollaston prisms are combined to form a polarization separation element.

A polarization separation element 701 shown in FIG. 10 may be used, which is composed of a plurality of polarization separation portions 710a, 710b, . . . , 710n with an appropriate size.

The polarized light illuminators of this example shown in FIGS. 8 to 12 use the first fly's eye lens 530, the second fly's eye lens 540, and the plano-convex lens 590 to illuminate the liquid crystal display device 600 with light. Alternatively, the plano-convex lens 590 may be omitted by using individual eccentric lenses for the lens portions of the first fly's eye lens 530 and the second fly's eye lens 540. A parabolic reflector or an elliptic reflector may be used as a reflector for the light source 500.

Figure 11:
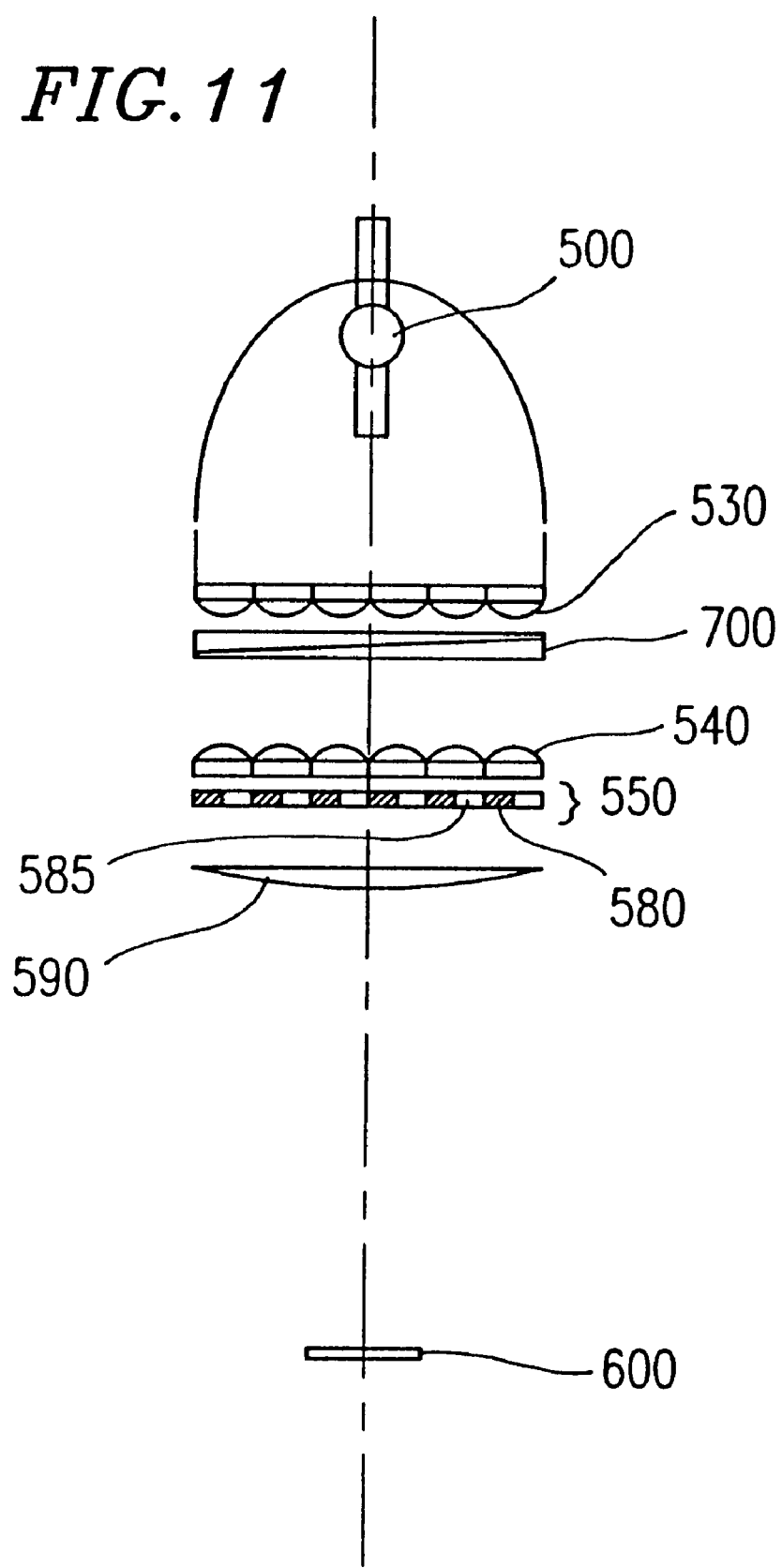
FIG. 11 is a schematic view illustrating a modification of Example 2 where the polarization separation element is disposed between a first fly's eye lens and a second fly's eye lens.

As shown in FIG. 11, the polarization separation element 700 may be disposed between the first fly's eye lens 530 and the second fly's eye lens 540. In this case, since the first fly's eye lens 530 can be disposed closer to the light source 500, the loss of light incident on the first fly's eye lens 530 can be reduced, and a more compact layout of the optical system is possible.

As in Example 1, the liquid crystal display device 600 of this example can be selected from a variety of constructions, such as that including a transmissive liquid crystal panel shown in FIG. 6 and that including a reflective liquid crystal panel shown in FIG. 7.

A projection type image display apparatus 30' and a polarized light illuminator 25' as an alternative of Example 2 will be described with reference to FIGS. 12 and 13.

Figure 12:
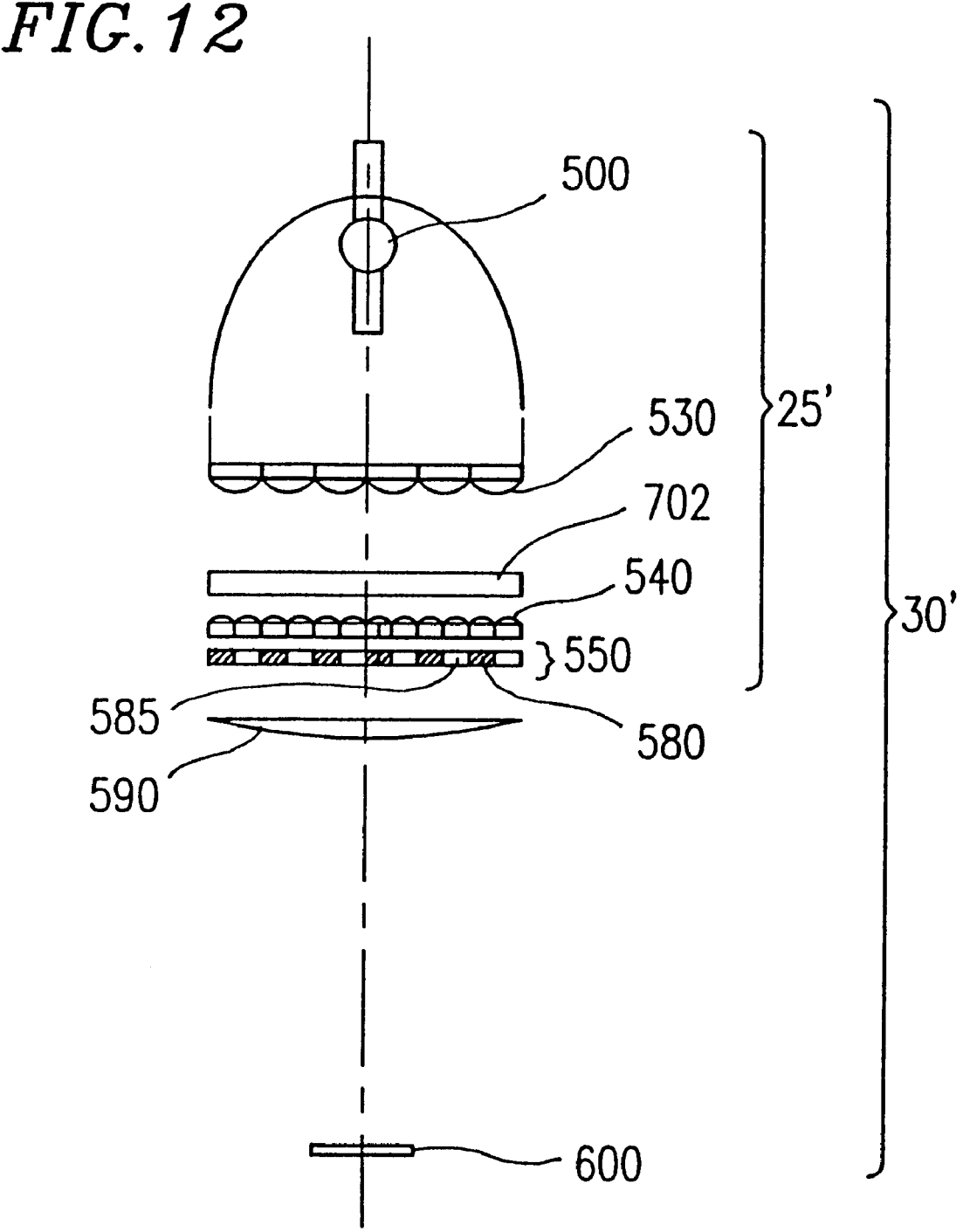
FIG. 12 is a schematic view of an alternative polarized light illuminator and image display apparatus according to Example 2 of the present invention.

Referring to FIG. 12, light emitted from a light source 500 is incident on a first fly's eye lens 530. The light output from the first fly's eye lens 530 is then incident on a polarization separation element 702 which is a flat plate made of crystal having birefringence. As shown in FIG. 13, the polarization separation element 702 has a crystal axis 702A in a out-of-plane direction with respect to the incident surface (the surface vertical to the incident optical axis) of the flat plate. Thus, the light incident on the polarization separation element 702 is separated into two light fluxes having polarization directions perpendicular to each other. The two fluxes are output from the polarized separation element 702 with the optical axes thereof being shifted.

The first and second polarized light fluxes having polarization directions perpendicular to each other output from the polarization separation element 702 are incident on adjacent lens portions of the second fly's eye lens 540. The first and second polarized light fluxes are then incident on a polarization conversion element 550 which is disposed close to the second fly's eye lens 540 on the output side thereof. The polarization conversion element 550 includes λ/2 wave plates 580 and transparent regions 585. The polarization direction of at least one of the first and second polarized light fluxes incident on the polarization conversion element 550 is rotated by 90°, so that the entire light output from the polarization conversion element 550 has a uniform polarization direction. A liquid crystal display device 600 is then illuminated with this light via the plano-convex lens 590.

Hereinbelow, the components of the projection type image display apparatus 30' including the polarized light illuminator 25' of Example 2 will be described in more detail.

The crystal used for the polarization separation element 702 may be any crystal having birefringence, such as lithium niobate, potassium phosphate titanate, and quartz.

The shift amount s of light separated by the polarization separation element 702 can be defined by expression (3) below.

$$s = p \quad (3)$$

wherein p denotes the lens pitch of the second fly's eye lens 540 in the direction where the converged light spots of the two separated light fluxes output from the polarization separation element 702 are formed side by side on the second fly's eye lens 540. For example, when p is 8 mm, s is about 8 mm.

With the above construction, the converged light spots of the two light fluxes having different polarization directions output from the first fly's eye lens 530 are formed side by side on the second fly's eye lens 540 roughly at the pitch p. Accordingly, even if light emitted from the light source has poor parallelism and thus the diameter of the converged light spot of the light increases, the light can be introduced into the second fly's eye lens 540 as long as the diameter of the converged light spot is equal to or less than p. This reduces light loss. Light loss which may be generated when light is incident on the polarization conversion element 550 disposed near the second fly's eye lens 540 can also be reduced.

As in the example shown in FIG. 8, the following modifications are possible for this alternative example. The polarization conversion element 550 may be disposed close to the second fly's eye lens 540 on the incident side thereof. The polarization conversion element 550 may be obtained by partly attaching the wave plate 580 to a surface of a flat glass plate. The projection type image display apparatus may have such a construction that can omit the plano-convex lens 590. Various types of reflectors may be used for the light source 500.

The liquid crystal display device 600 of this alternative example can also be selected from a variety of constructions, such as that including a transmissive liquid crystal panel shown in FIG. 6 and that including a reflective liquid crystal panel shown in FIG. 7.

Figure 13:
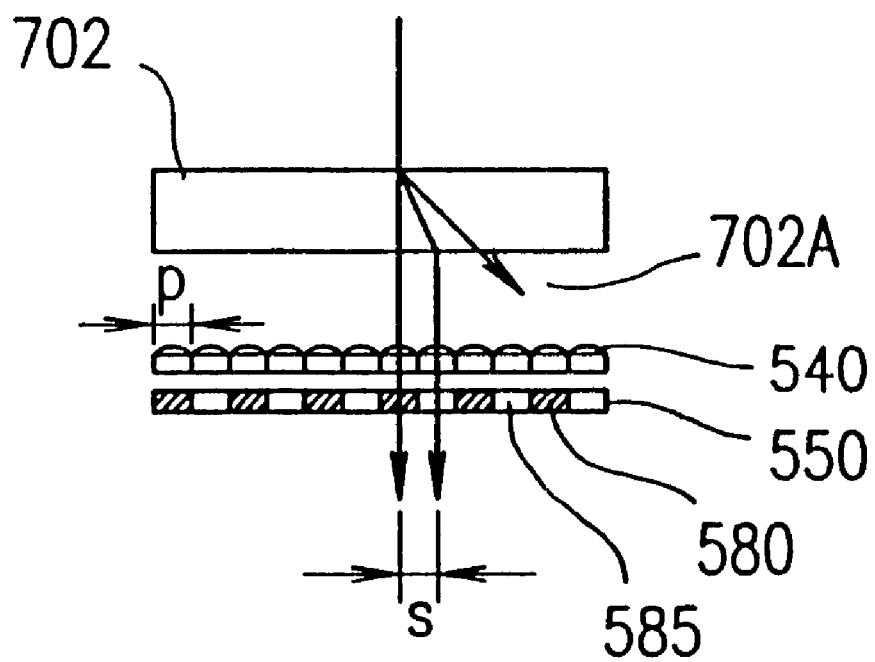
FIG. 13 is a schematic view of the polarization separation element shown in FIG. 12.

Thus, the alternative polarized light illuminator of Example 2 shown in FIGS. 12 and 13 provides substantially the same effects as that described above. Since this alternative example uses a flat plate made of crystal having birefringence as the polarization separation element, it has an advantage of realizing a reduction in cost, compared with the case of using a Wollaston prism and the like as the polarization separation element.

By constructing the polarization separation element so as to satisfy expression (3), light loss can be reduced even if light emitted from the light source has poor parallelism and as a result the diameter of the converged light spot increases.

EXAMPLE 3

A projection type image display apparatus and a polarized light illuminator of Example 3 according to the present invention, as well as modifications thereof, will be described with reference to FIGS. 14 to 17.

Figure 14:
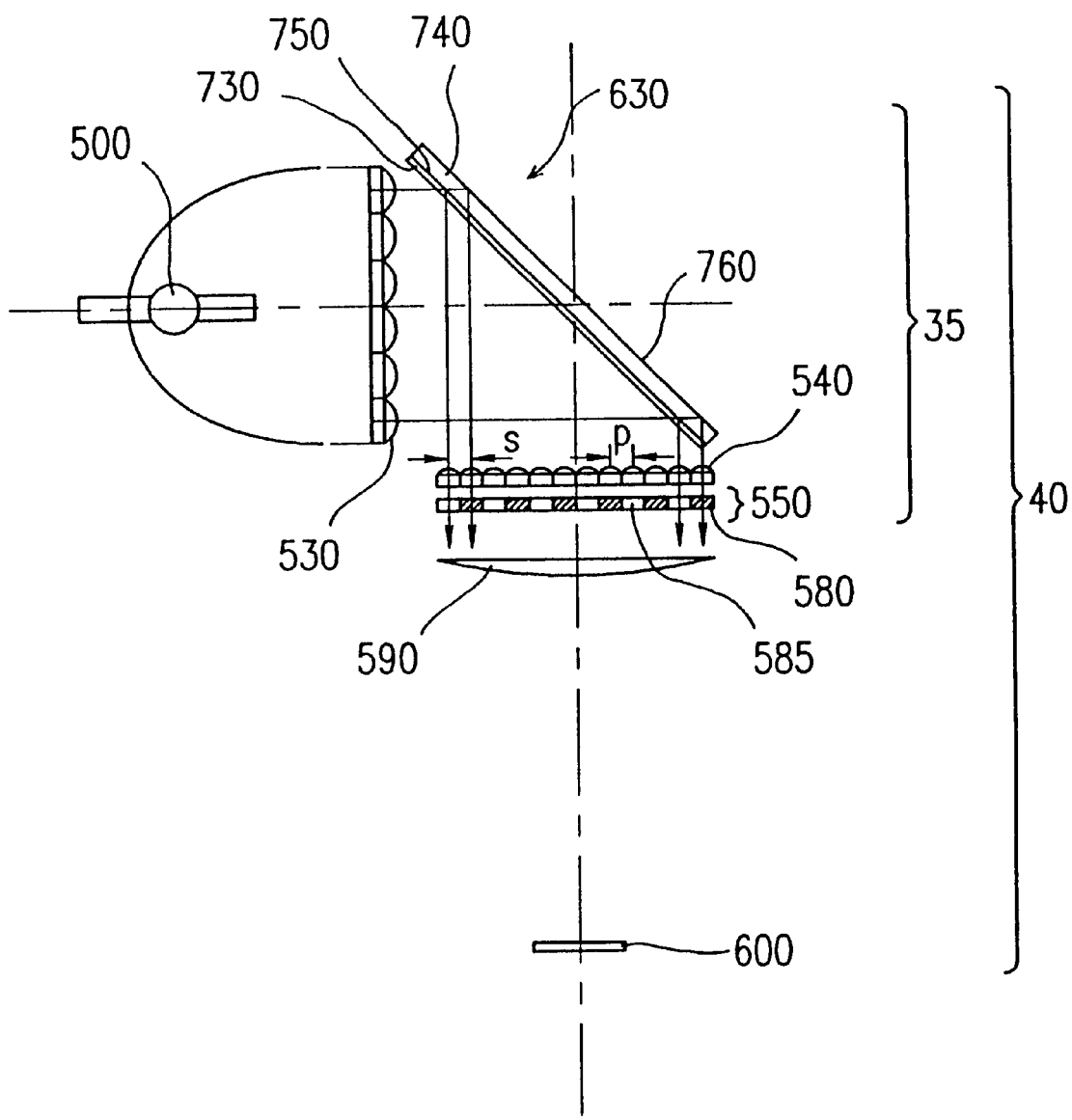
FIG. 14 is a schematic view of a projection type image display apparatus including a polarized light illuminator according to Example 3 of the present invention.

Referring to FIG. 14, a projection type image display apparatus 40 includes a polarized light illuminator 35, a plano-convex lens 590, a liquid crystal display device 600, and a projection lens (not shown) for magnifying and projecting an image obtained by the liquid crystal display device 600. The polarized light illuminator 35 includes a light source 500, a polarization separation element 630, a first fly's eye lens 530, a second fly's eye lens 540, and a polarization conversion element 550. The polarization conversion element 550 includes λ/2 wave plates 580 and transparent regions 585. Light which has passed through the left half of each lens portion of the second fly's eye lens 540 passes through the corresponding transparent region 585, while light which has passed through the right half thereof passes through the corresponding λ/2 wave plate 580.

Light emitted from the light source 500 is incident on the first fly's eye lens 530. The light output from the first fly's eye lens 530 is then incident on the polarization separation element 630 composed of flat glass plates 730 and 740. The flat glass plate 730 includes a surface having the polarization separation function (a polarization separation surface 750) on the side away from the light source 500 (i.e., between the flat glass plates 730 and 740). The flat glass plate 740 includes a surface having the reflection function (a reflection surface 760) on the side away from the light source 500. The light incident on the polarization separation element 630 is reflected from or passes through the polarization separation surface 750, to be separated into first and second polarized light components having polarization directions perpendicular to each other. The light component which has passed through the polarization separation surface 750 is reflected by the reflection surface 760 formed on the back surface of the flat glass plate 740 and passes again through the polarization separation surface 750.

Thus, the first and second polarized light components having polarization directions perpendicular to each other are output from the polarization separation element 630 to be incident on the second fly's eye lens 540, with the optical axes thereof being shifted from each other. The polarization directions of the first and second polarized light components are unified by the polarization conversion element 550 disposed close to the second fly's eye lens 540 (on either the incident side or the output side thereof). The light output from the polarization conversion element 550 is then directed to the liquid crystal display device 600 via the plano-convex lens 590 so that the liquid crystal display device 600 is illuminated with the light.

In the polarized light illuminator of Example 3 with the above construction, as in Examples 1 and 2, light from the light source 500 can be effectively utilized.

Hereinbelow, the components of the projection type image display apparatus 40 including the polarized light illuminator 35 of Example 3 will be described in more detail.

The reflection surface 760 can be obtained by evaporating metal such as aluminium on a surface of the flat glass plate 740, as in the conventional case. Alternatively, the reflection surface 760 may be formed of a dielectric multilayer film.

The flat glass plate 730 having the polarization separation surface 750 may be composed of a polarization separation selective reflection element as in Example 1.

The polarization separation surface 750 may be formed by providing a polarization separation interlayer film composed of a dielectric multilayer film on a surface of the flat glass plate, as in the case of the polarization separation surface 560 in Example 1.

The shift amount s of light separated by the polarization separation element 630 can be defined by expression (3) shown in Example 2. Therefore, as in the previous examples, even if light emitted from the light source has poor parallelism and thus the diameter of the converged spot of the light increases, the light can be introduced into the second fly's eye lens 540 as long as the diameter of the converged light spot is equal to or less than p, reducing light loss. Light loss which may be generated when light is incident on the polarization conversion element 550 disposed near the second fly's eye lens 540 can also be reduced.

As in Examples 1 and 2, the polarization conversion element 550 may be disposed close to the second fly's eye lens 540 on the incident side thereof. As in Examples 1 and 2, the polarization conversion element 550 may be obtained by partly attaching the wave plate 580 to a surface of a flat glass plate, for example.

In the polarized light illuminator of Example 3 shown in FIG. 14, the polarization separation element 630 having the polarization separation surface 750 and the reflection surface 760 is composed of only flat plates, using no large glass prism. As a result, an increase in cost and weight of the device can be suppressed.

The device of this example includes only one glass incident/output surface which should be subjected to AR coating. This contributes to cost reduction. Moreover, since the polarization separation element is composed of only thin flat plates, an aberration which may be generated when light passes through these plates can be suppressed. This results in suppressing an increase in the diameter of converged light spots on the second fly's eye lens 540 and thus reduces light loss.

In this example, the polarization separation element 630 shown in FIG. 14 includes the polarization separation surface 750 on the surface of the flat glass plate 730 facing the flat glass plate 740 and the reflection surface 760 on the surface of the flat glass plate 740 away from the light source 500. Other arrangement may also be adopted as long as the polarization separation surface 750 and the reflection surface 760 are disposed in parallel with each other.

Figure 15:
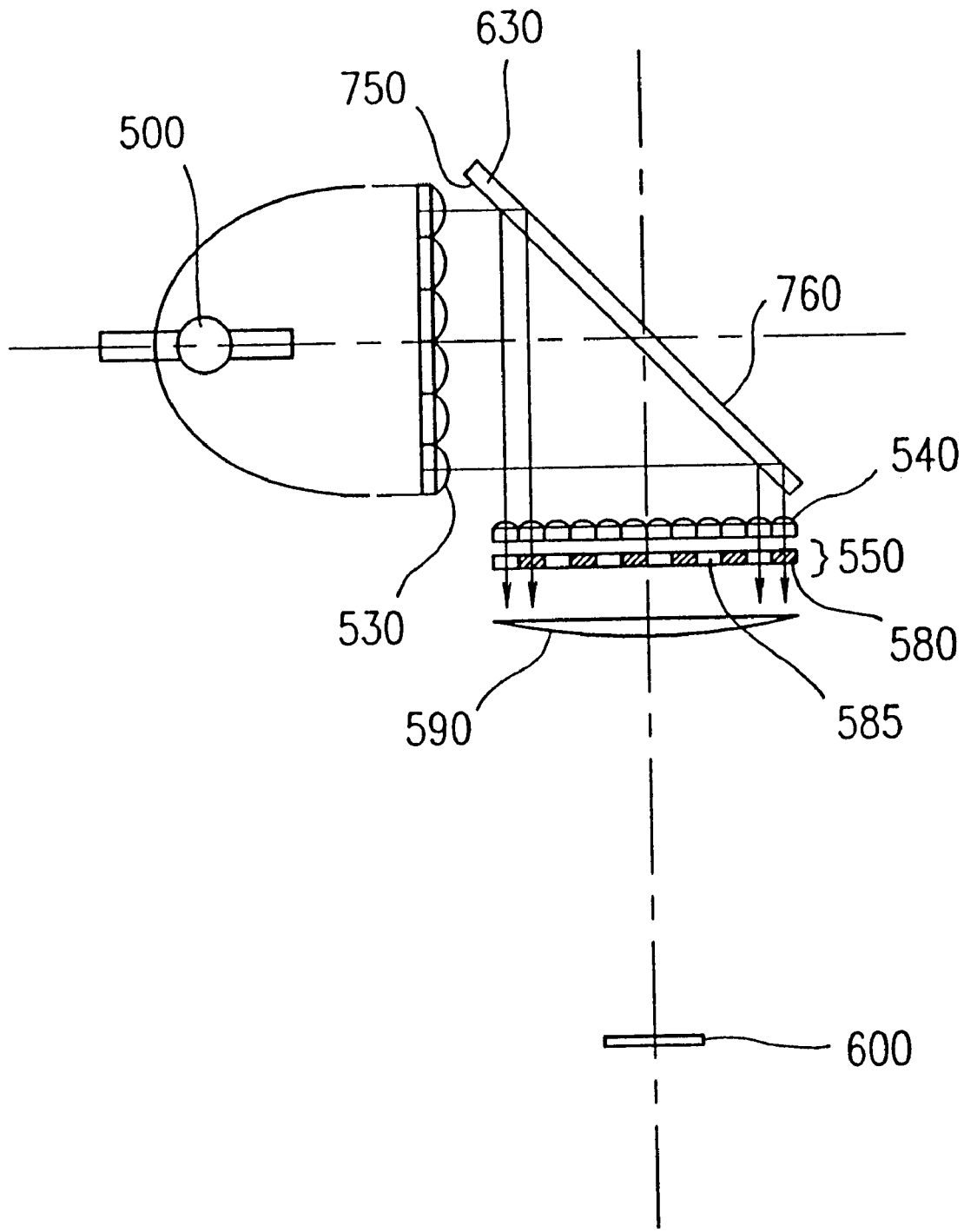
FIG. 15 is a schematic view illustrating a modification of Example 3 where the polarization separation element is composed of a single flat glass plate.

For example, as shown in FIG. 15, the polarization separation element 630 may be composed of a single flat plate having the polarization separation surface 750 on the side thereof closer to the light source 500 and the reflection surface 760 on the opposite side farther from the light source 500. In this case, since light emitted from the light source 500 is directly incident on the polarization separation surface 750, the number of optical surfaces which are required to be subjected to AR coating can be reduced, and thus reducing the cost.

Since the polarization separation element is composed of only a thin flat plate, an aberration which may be generated when light passes through the plate can be suppressed. This results in suppressing an increase in the diameter of converged light spots on the second fly's eye lens and thus reduces light loss. In addition, since the polarization separation element is composed of the single flat plate 630, the number of components and thus the cost can be reduced when compared with the conventional construction combining a flat plate and a rectangular prism.

Figure 16:
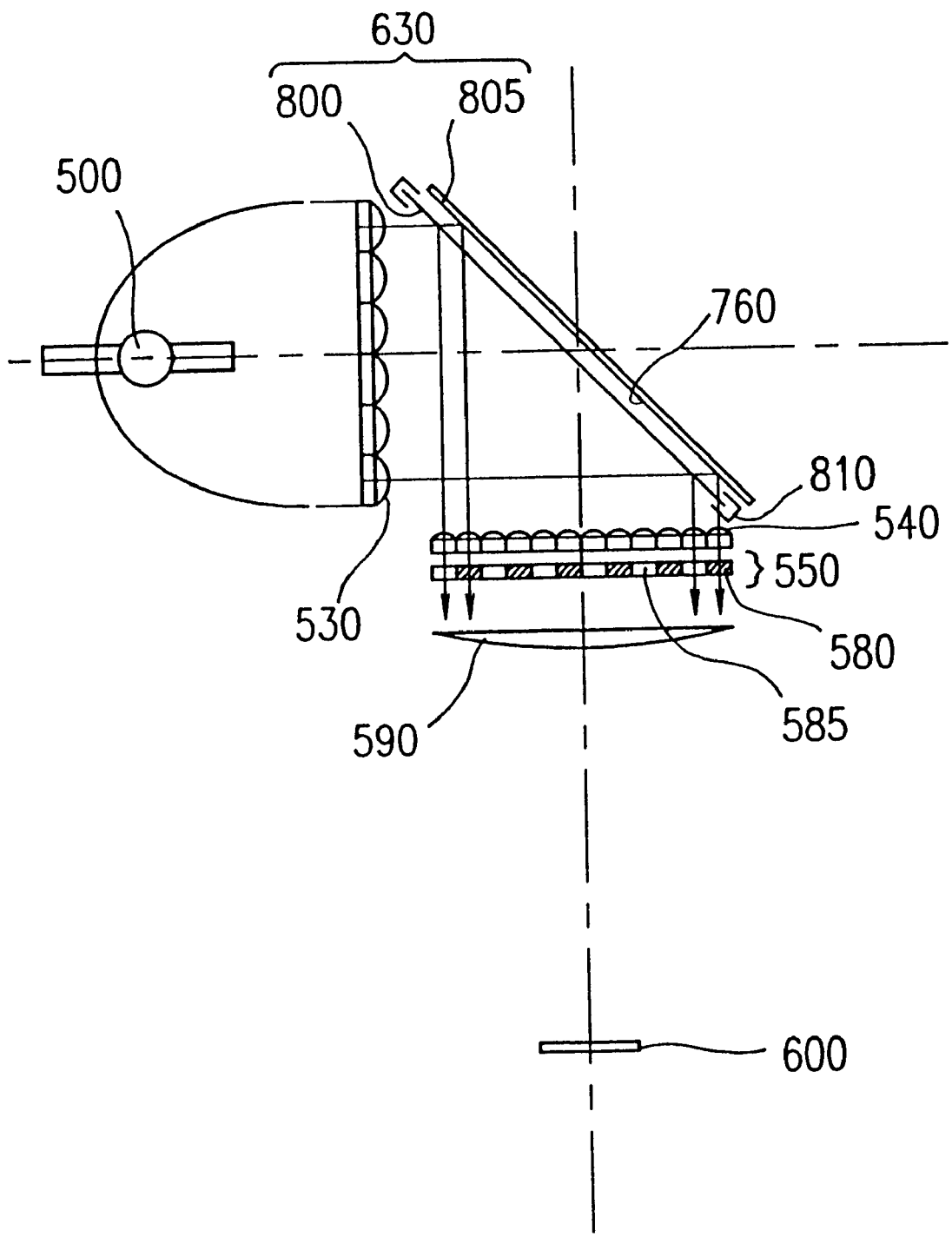
FIG. 16 is a schematic view illustrating a modification of Example 3 where the polarization separation element is composed of a polarization selective reflection film and a flat plate mirror.

Alternatively, as shown in FIG. 16, a polarization separation selective reflection film 800, which is supported by a frame 810, may be used for polarization separation. A flat plate 805 is disposed separately from the polarization separation selective reflection film 800 and has the reflection surface 760 on the surface thereof closer to the light source 500. This construction reduces an effect of aberration which may be generated when light passes through a flat glass plate, and thus suppresses an increase in the diameter of converged light spot on the second fly's eye lens 540. As a result, the light loss can be reduced.

Figure 17:
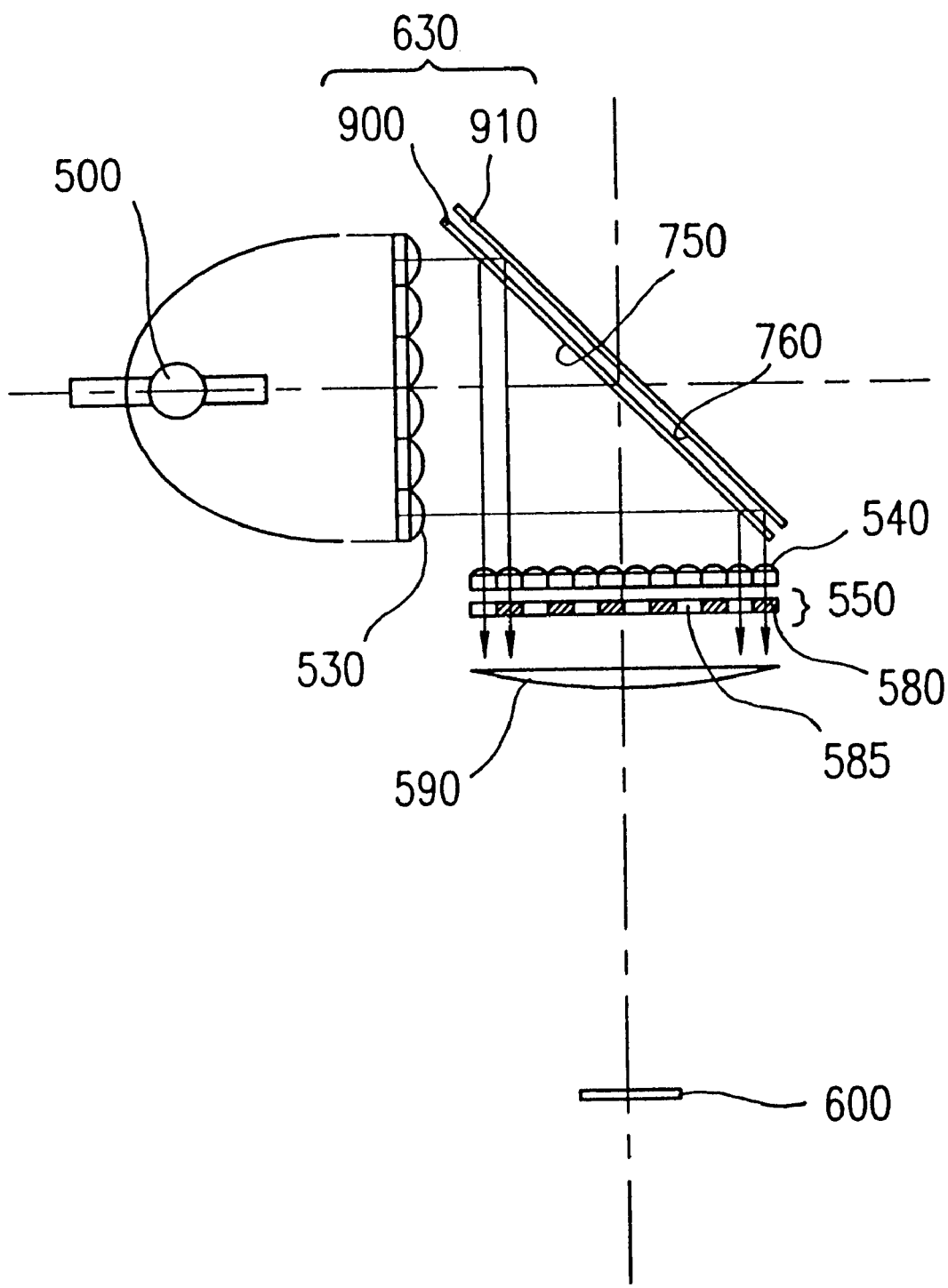
FIG. 17 is a schematic view illustrating a modification of Example 3 where the polarization separation element is composed of two flat glass plates.
Figure 18:
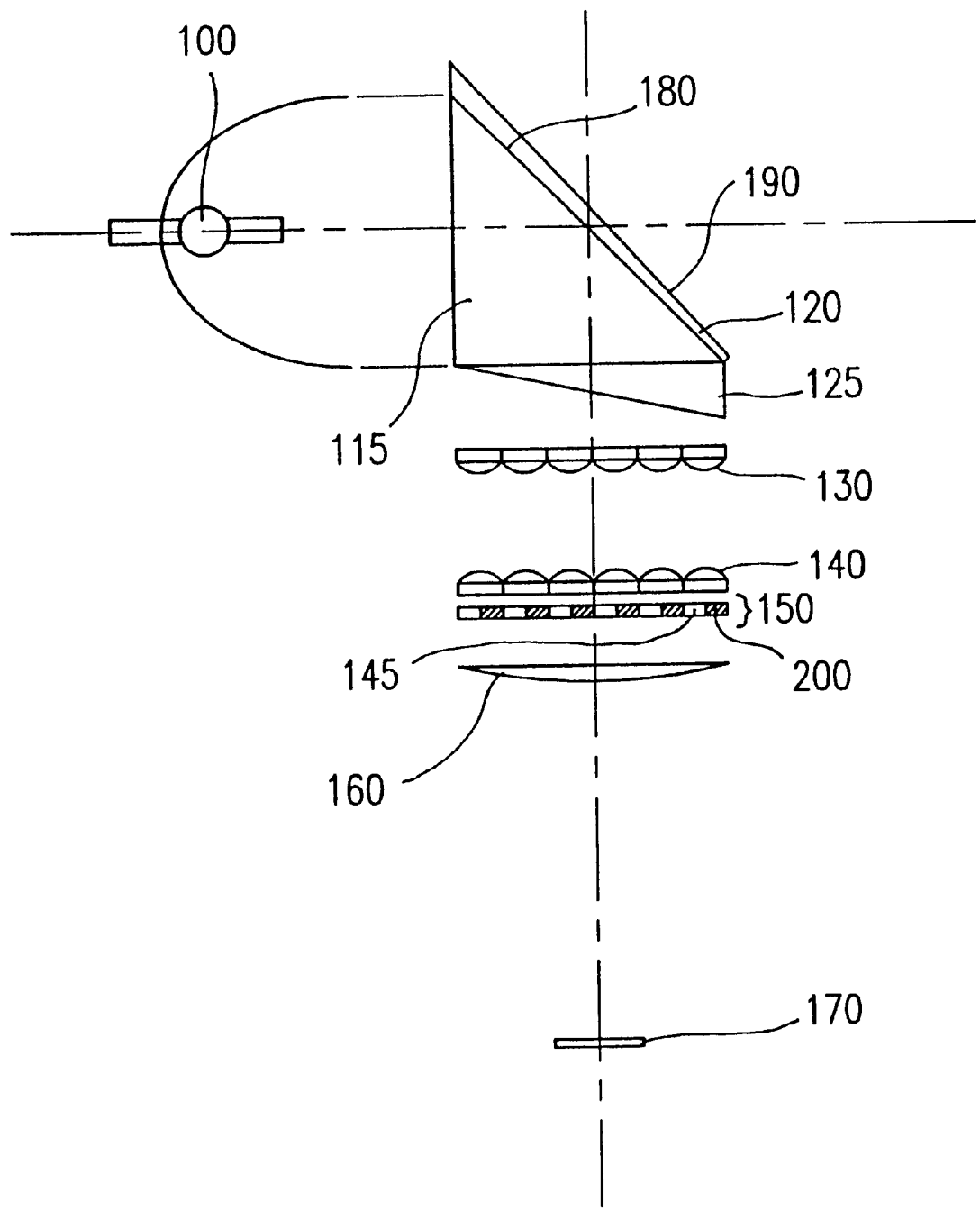
FIG. 18 is a schematic view of a conventional polarized light illuminator using a rectangular prism and a wave type prism.

Alternatively, as shown in FIG. 17, the polarization separation element 630 may be composed of two flat plates 900 and 910 disposed in parallel with each other. The flat plate 900 includes the polarization separation surface 750 having the polarization separation function, and the flat plate 910 includes the reflection surface 760 having the reflection function. The polarization separation surface 750 and the reflection surface 760 are desirably formed on the surfaces of the flat plates 900 and 910, respectively, closer to the first fly's eye lens 530.

In the above alternative construction shown in FIG. 17, since the polarization separation element 630 is composed of only the thin flat plates 900 and 910, an aberration which may be generated when light passes through these plates can be suppressed. This suppresses an increase in the diameter of converged light spots on the second fly's eye lens 540.

Since the polarization separation element 630 is composed of only the two flat plates, low cost is realized compared with the conventional construction using a rectangular prism.

As in Examples 1 and 2, the polarization conversion element 550 may be disposed close to the second fly's eye lens 540 on the incident side thereof. As in Examples 1 and 2, the projection type image display apparatus may have such a construction that can omit the plano-convex lens 590. Various types of reflectors may be used for the light source 500.

The liquid crystal display device 600 of Example 3 may also be selected from a variety of constructions, such as that including a transmissive liquid crystal panel shown in FIG. 6 and that including a reflective liquid crystal panel shown in FIG. 7.

Thus, according to the present invention, a polarized light illuminator which effectively utilizes light from the light source and suppresses an increase in weight and cost is realized. A projection type image display apparatus which reduces the loss of light for the illumination of an image display device and suppresses an increase in weight and cost is realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A polarized light illuminator comprising:

a light source;

a first fly's eye lens and a second fly's eye lens disposed in this order from the light source;

a polarization separation element disposed between the light source and the second fly's eye lens for separating unpolarized light into a first polarized light component and a second polarized light component having polarization directions perpendicular to each other, to output the first polarized light component and the second polarized light component in different directions from each other; and a polarization conversion element disposed near the second fly's eye lens for converting the first polarized light component and the second polarized light component output from the polarization separation element into unidirectionally polarized light, wherein the polarization separation element has a first flat plate and a second flat plate, the first flat plate having a polarization separation surface for reflecting the first polarized light component and transmitting the second polarized light component, while the second flat plate having a reflection surface for reflecting the second polarized light component which has passed through the first flat plate, the polarization separation surface and the reflection surface being disposed at different angles from each other with respect to the optical axis of the light source.

2. A polarized light illuminator according to claim 1, wherein the polarization separation element is disposed between the light source and the first fly's eye lens.

3. A polarized light illuminator according to claim 1, wherein the polarization separation surface of the first flat plate has an optic axis in the plane of the polarization separation surface, and the direction of the optic axis is substantially equal to a direction of a polarization axis of the first polarized light component.

4. A polarized light illuminator according to claim 1, wherein the polarization separation surface of the first flat plate and the reflection surface of the second flat plate are disposed to face each other.

5. A polarized light illuminator according to claim 1, wherein the first flat plate and the second flat plate are disposed substantially at an angle $\theta$ represented by an expression below with each other:

$$\theta=\tan^{-1}(p/4d)$$

where d denotes a distance between the first fly's eye lens and the second fly's eye lens, and p denotes a lens pitch of the second fly's eye lens in a direction where converged spots of the light reflected by the polarization separation surface and the light reflected by the reflection surface are formed side by side.

6. A polarized light illuminator according to claim 5, wherein the first flat plate and the second flat plate are disposed substantially at an angle of $45°-\theta/2$ and $45°+\theta/2$, respectively, with respect to the optical axis of the light source.

7. A polarized light illuminator comprising:

a light source;

a first fly's eye lens and a second fly's eye lens disposed in this order from the light source;

a polarization separation element disposed between the light source and the second fly's eye lens for separating unpolarized light into a first polarized light component and a second polarized light component having polarization directions perpendicular to each other, to output the first polarized light component and the second polarized light component in different directions from each other; and a polarization conversion element disposed near the second fly's eye lens for converting the first polarized light component and the second polarized light component output from the polarization separation element into unidirectionally polarized light, wherein the polarization separation element is formed of crystal having birefringence.

8. A polarized light illuminator according to claim 7, wherein the polarization separation element is composed of a Wollaston prism, and the polarization separation element is disposed between the first fly's eye lens and the second fly's eye lens.

9. A polarized light illuminator according to claim 7, wherein the polarization separation element is composed of a Wollaston prism, and the polarization separation element is disposed between the light source and the first fly's eye lens.

10. A polarized light illuminator according to claim 7, wherein the polarization separation element is composed of a flat plate formed of crystal having birefringence, and the polarization separation element is disposed between the first fly's eye lens and the second fly's eye lens.

11. A projection type image display apparatus comprising: a polarized light illuminator according to claim 1; an image display device for being illuminated with polarized light of which the polarization direction is unified by the polarized light illuminator; and a projection lens for magnifying and projecting an image obtained by the image display device.

12. A projection type image display apparatus comprising: a polarized light illuminator according to claim 7; an image display device for being illuminated with polarized light of which the polarization direction is unified by the polarized light illuminator; and a projection lens for magnifying and projecting an image obtained by the image display device.

* * * * *